(12) United States Patent
Huang et al.

(10) Patent No.: US 7,941,298 B2
(45) Date of Patent: May 10, 2011

(54) NOISE-ASSISTED DATA ANALYSIS METHOD, SYSTEM AND PROGRAM PRODUCT THEREFOR

(75) Inventors: Norden E. Huang, Bethesda, MD (US); Zhaohua Wu, Laurel, MD (US)

(73) Assignee: DynaDx Corporation, Mountain View, CA (US)

( * ) Notice: Subject to any disclaimer, the term of this patent is extended or adjusted under 35 U.S.C. 154(b) by 0 days.

(21) Appl. No.: 11/470,947

(22) Filed: Sep. 7, 2006

(65) Prior Publication Data
US 2008/0065337 A1    Mar. 13, 2008

(51) Int. Cl.
*H04B 15/00*    (2006.01)

(52) U.S. Cl. ......... 702/194; 702/189; 702/193; 702/197

(58) Field of Classification Search ............... 702/75, 702/76, 104, 179, 189, 190; 370/242; 704/226; 382/154

See application file for complete search history.

(56) References Cited

U.S. PATENT DOCUMENTS

| | | | |
|---|---|---|---|
| 6,782,124 B2 * | 8/2004 | Gloersen | 382/154 |
| 6,862,558 B2 * | 3/2005 | Huang | 702/194 |
| 6,901,353 B1 * | 5/2005 | Huang | 702/189 |

* cited by examiner

*Primary Examiner* — Mohamed Charioui
*Assistant Examiner* — Felix E Suarez
(74) *Attorney, Agent, or Firm* — SV Patent Service

(57) ABSTRACT

An apparatus, computer program product and method of analyzing complex signals. Independent versions are generated for the complex signal, e.g., by adding multiple instances of white noise. Intrinsic mode functions (IMFs) are extracted from each of the independent versions, e.g., using Empirical Mode Decomposition (EMD). Corresponding IMFs from each independent version are combined into Ensemble IMFs (EIMFs), e.g., taking the mean of the corresponding IMFs.

25 Claims, 24 Drawing Sheets

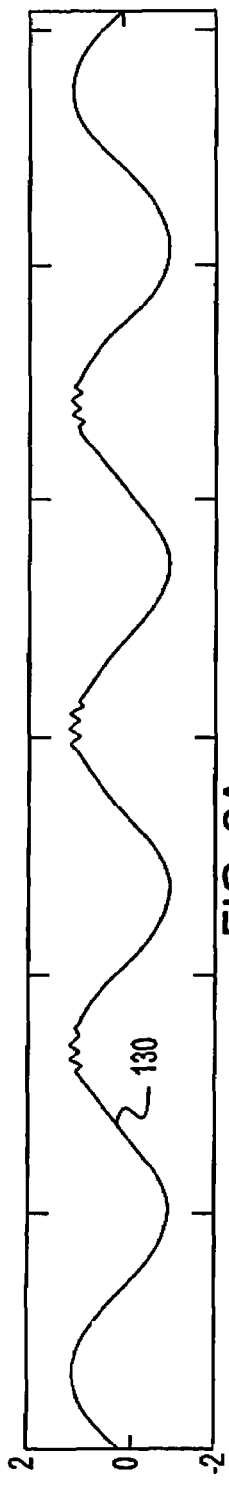
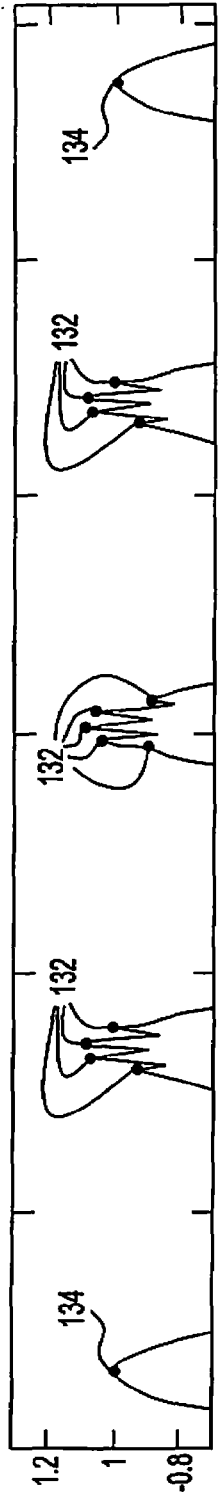
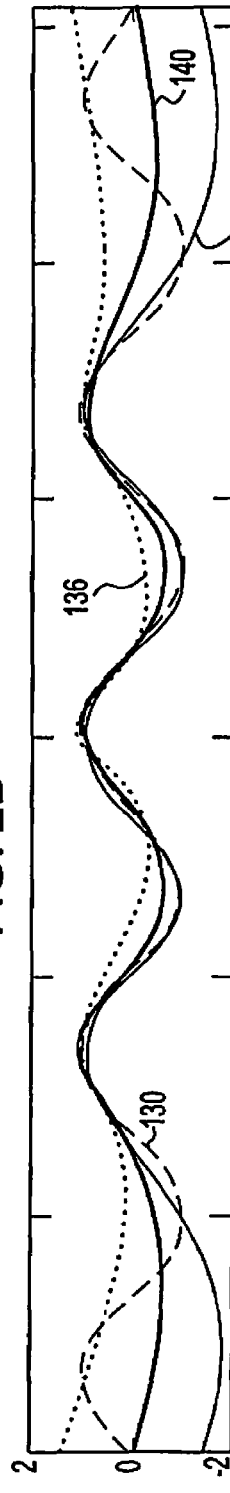
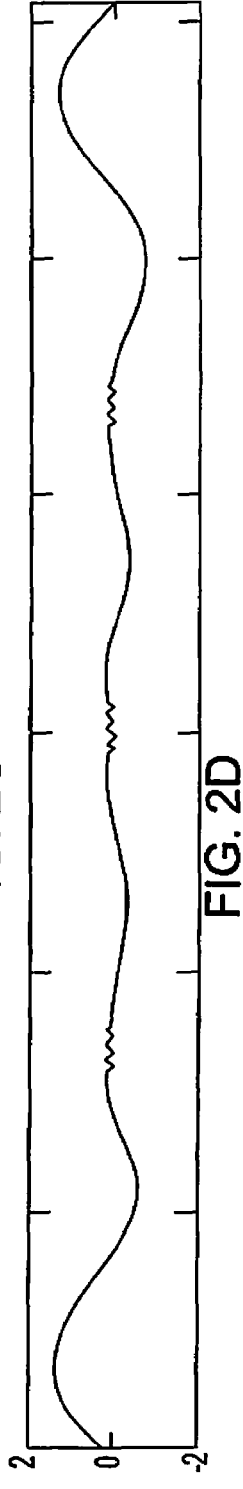
FIG. 2A
FIG. 2B
FIG. 2C
FIG. 2D

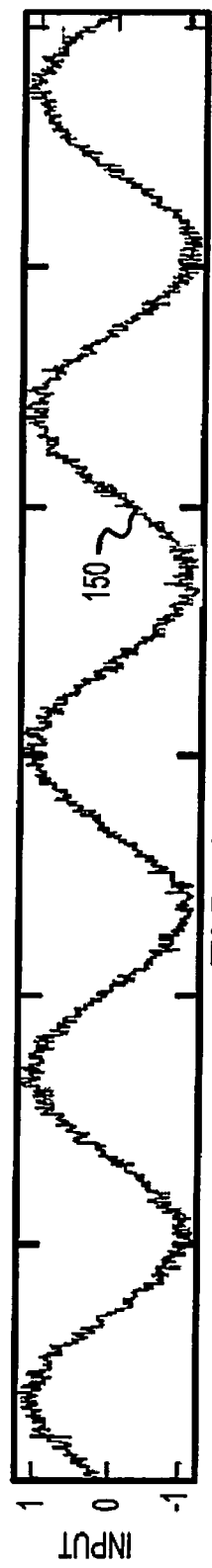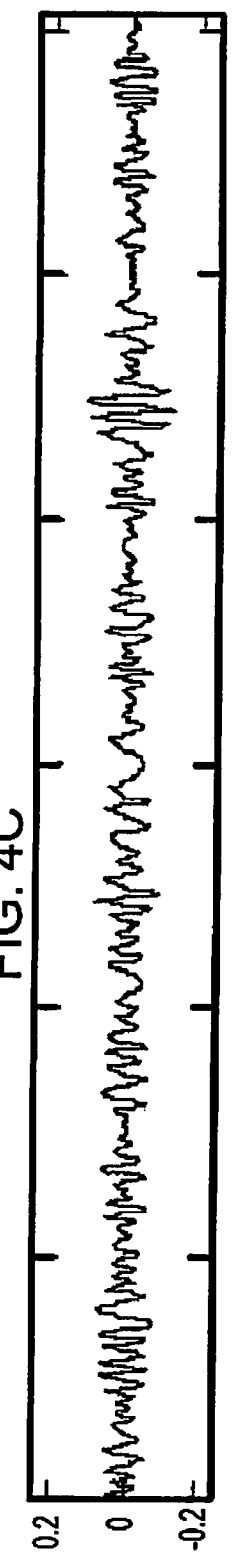

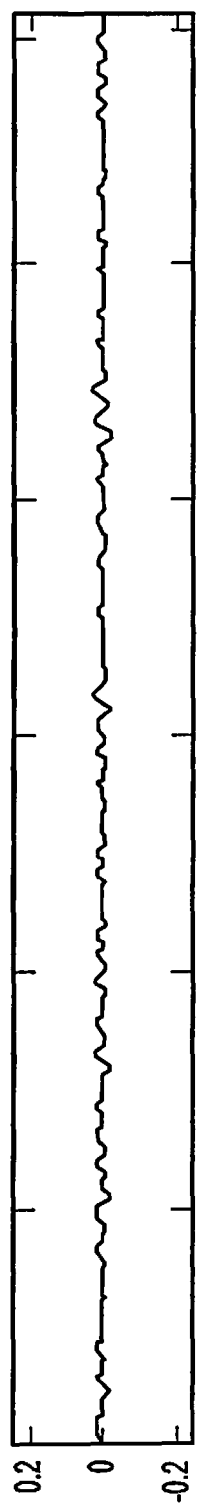
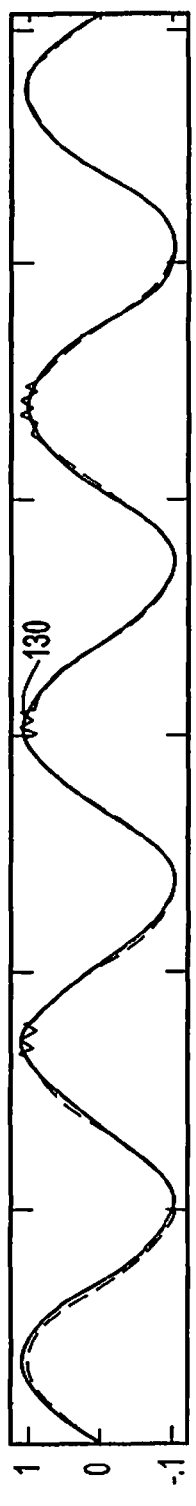
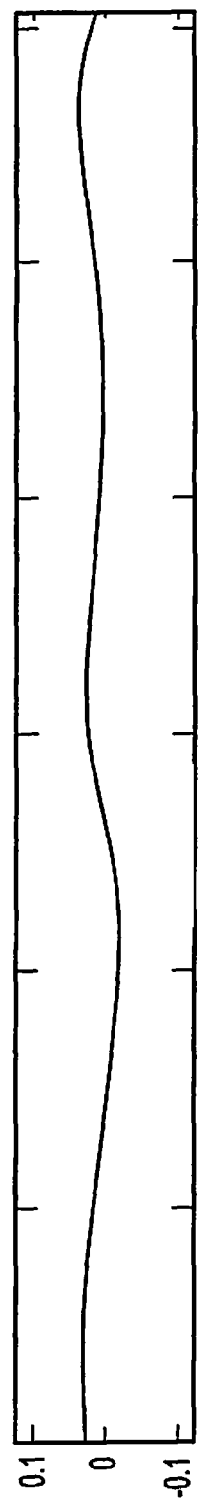
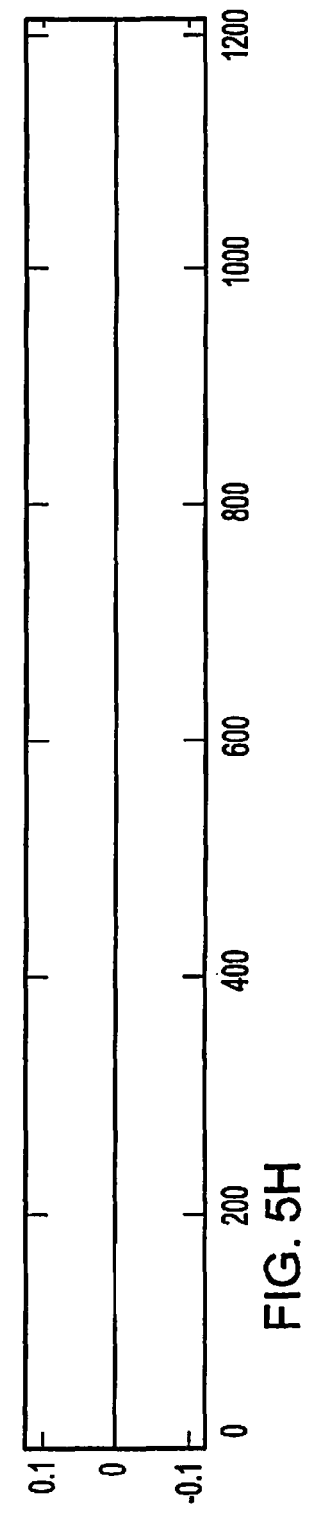
FIG. 5E
FIG. 5F
FIG. 5G
FIG. 5H

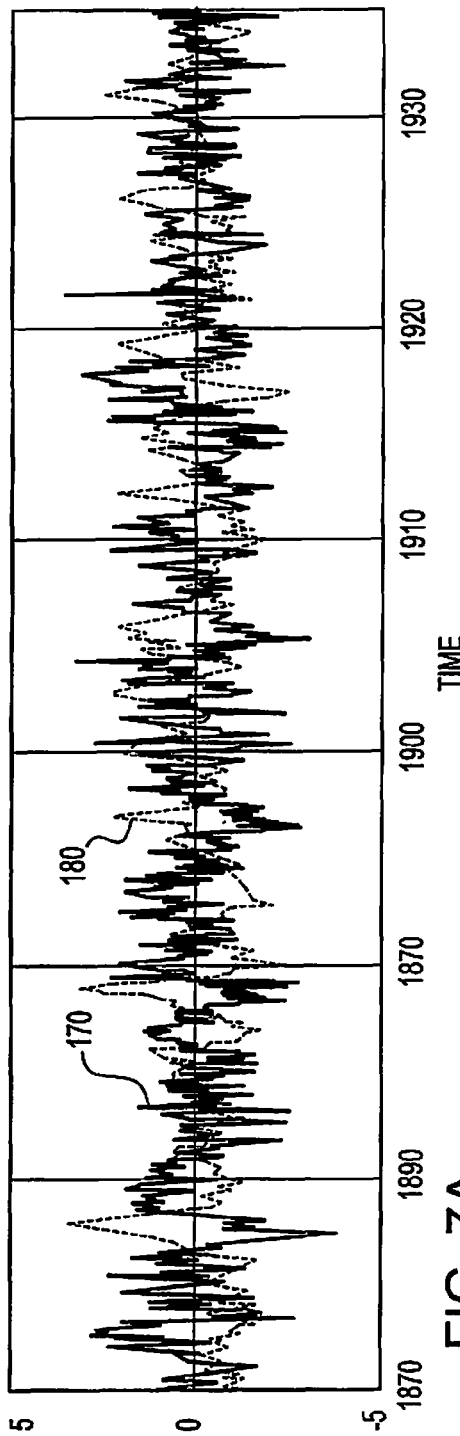
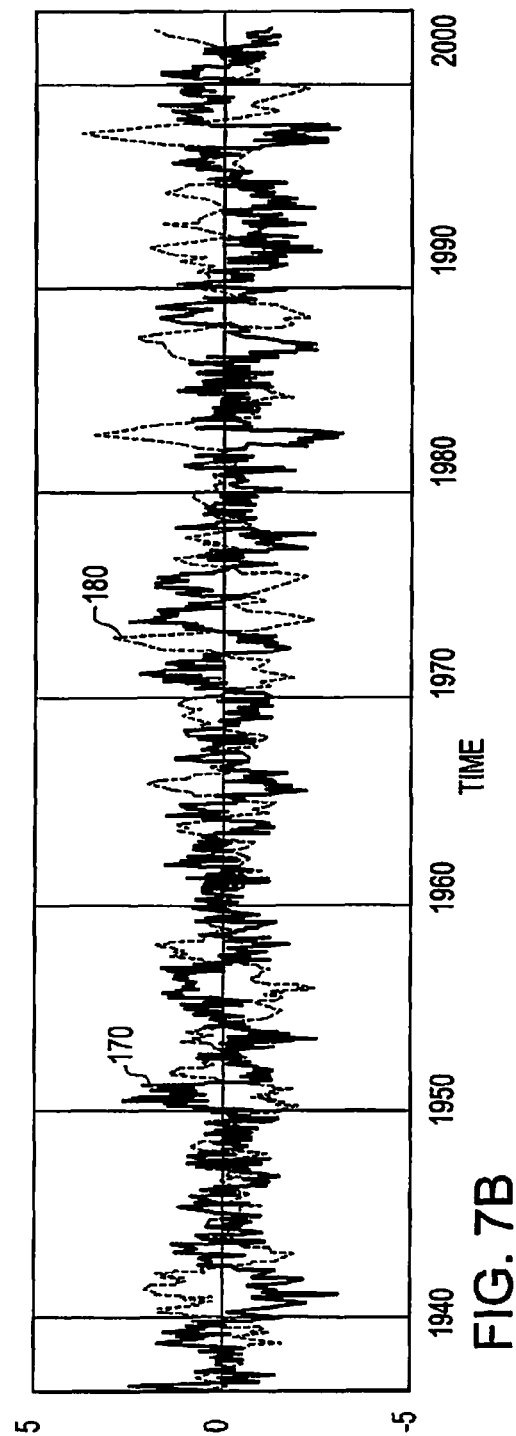
FIG. 7A
FIG. 7B

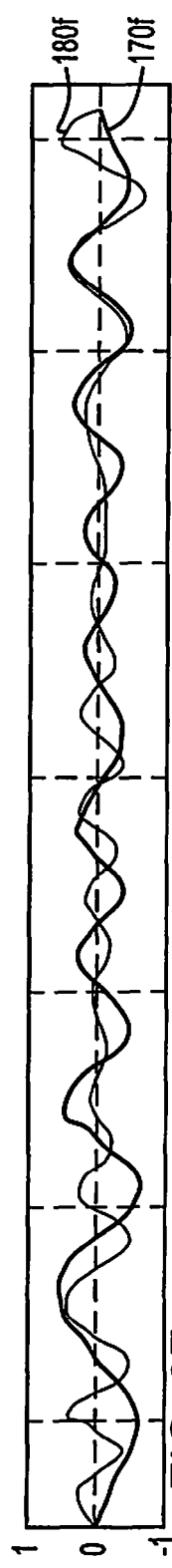
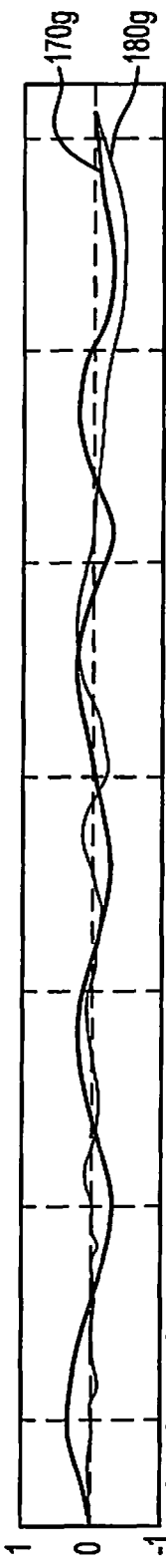
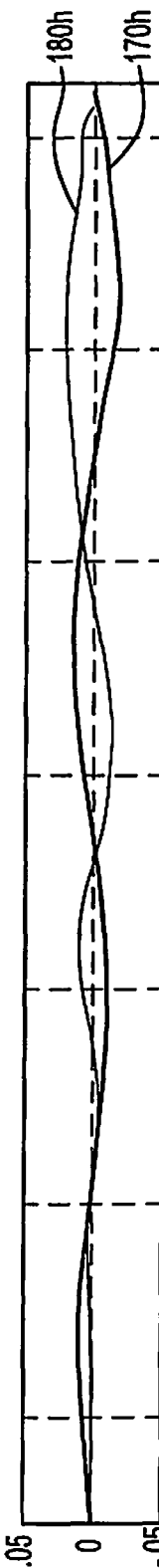
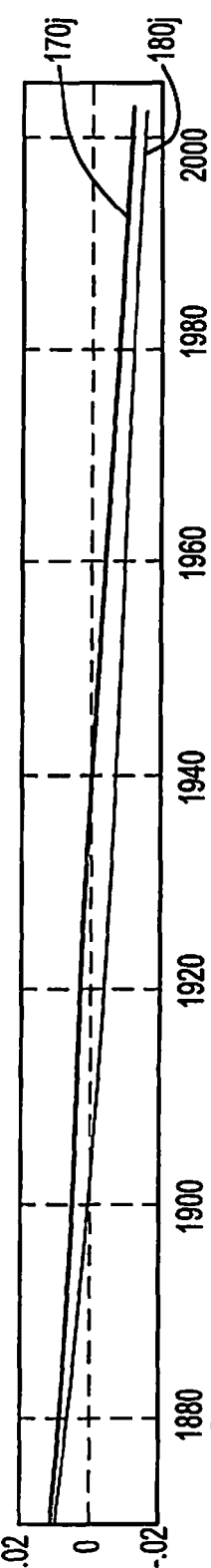

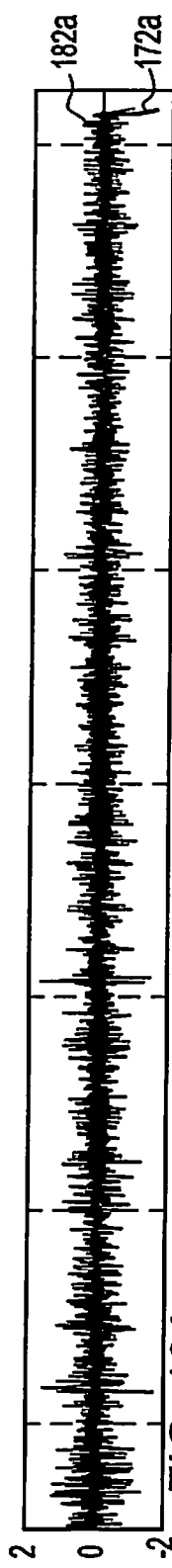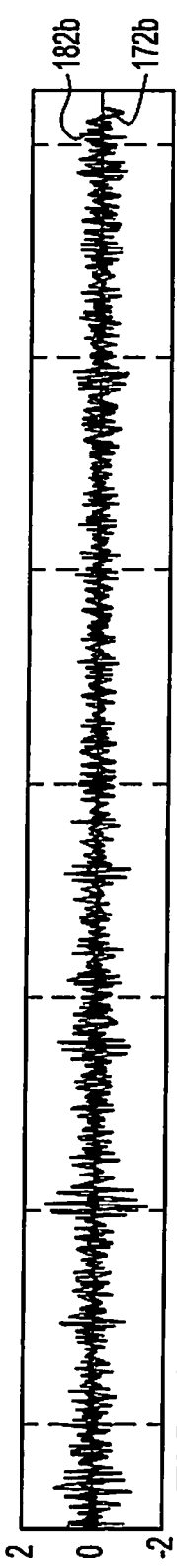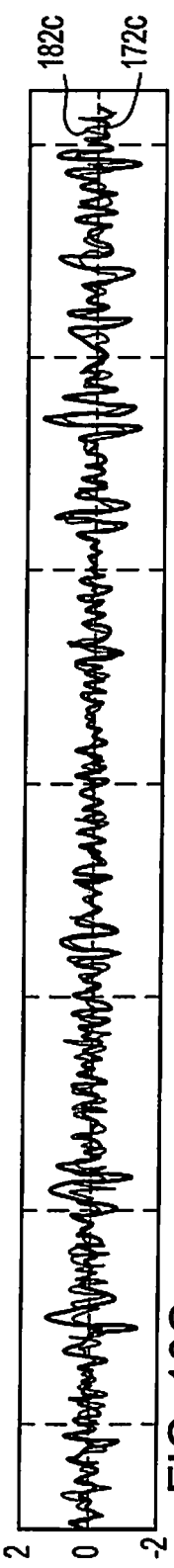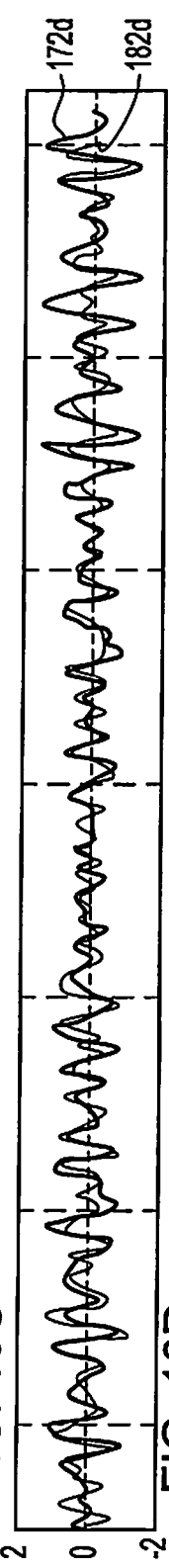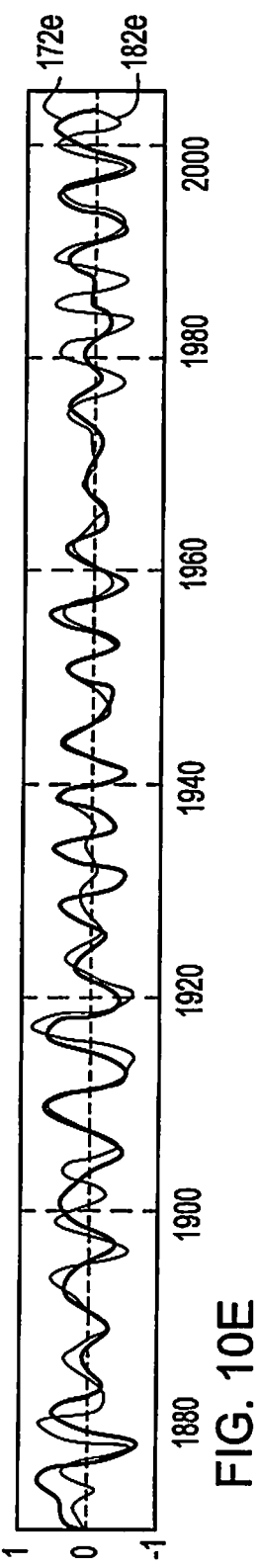

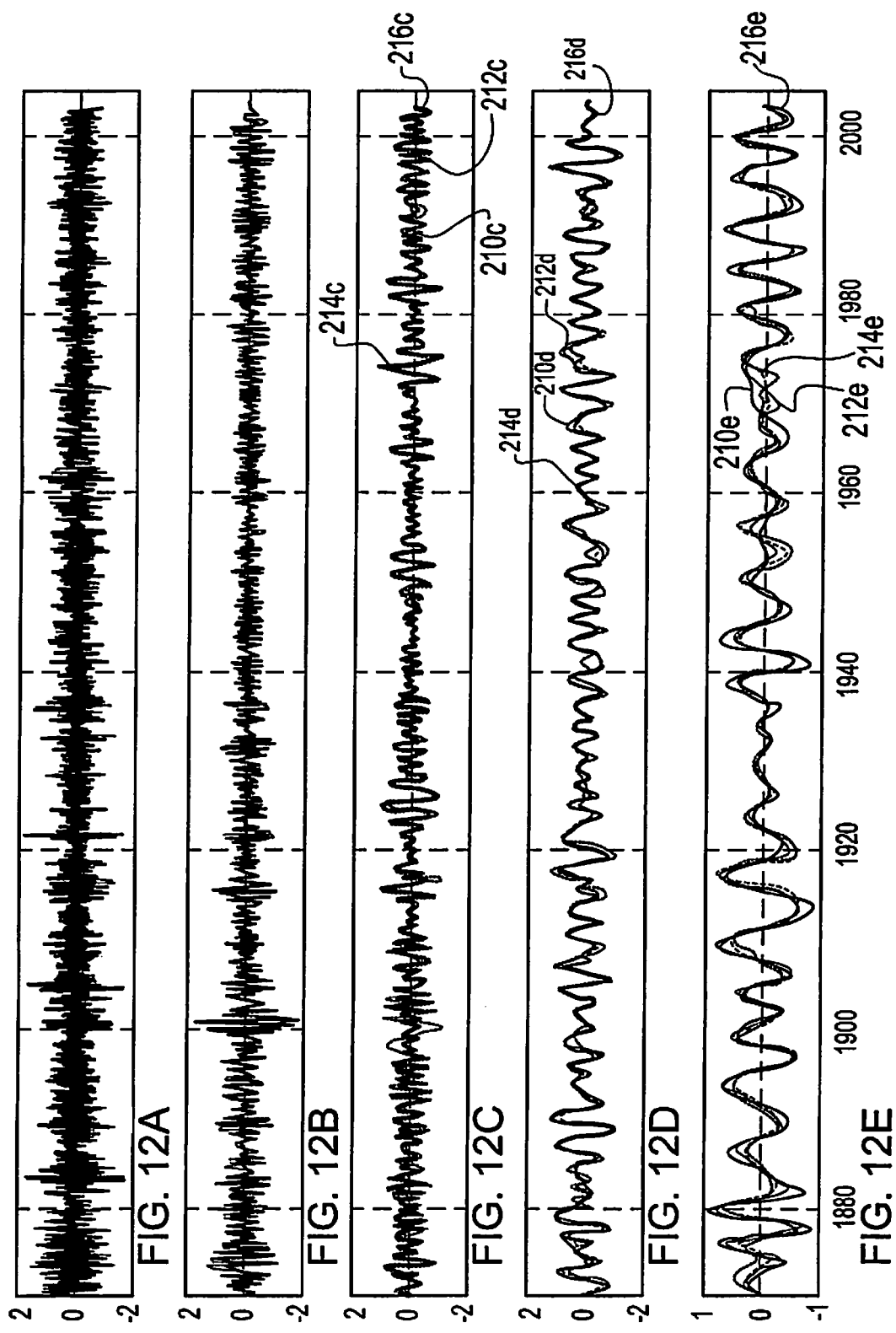

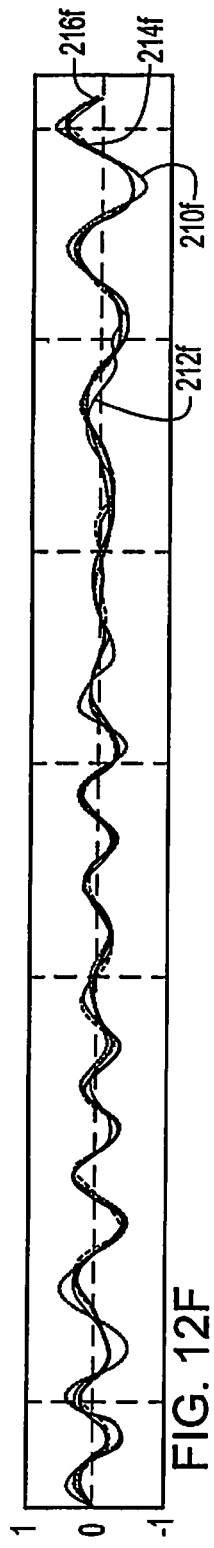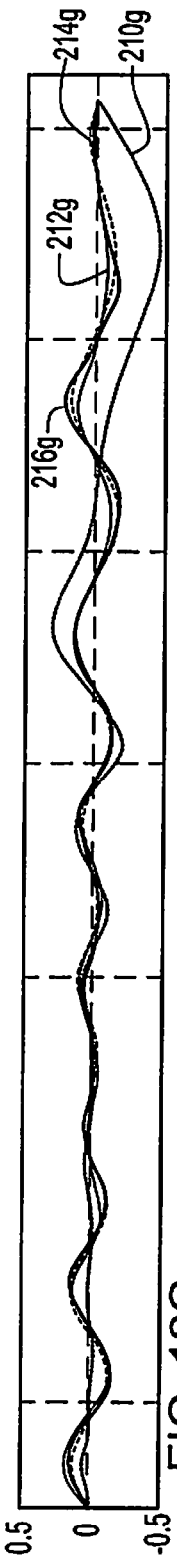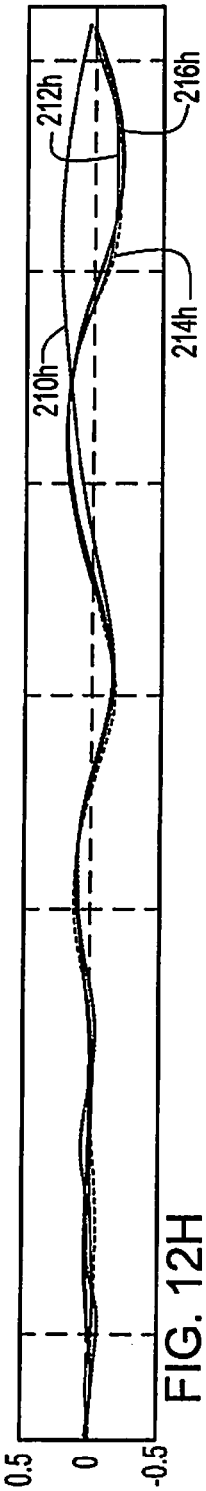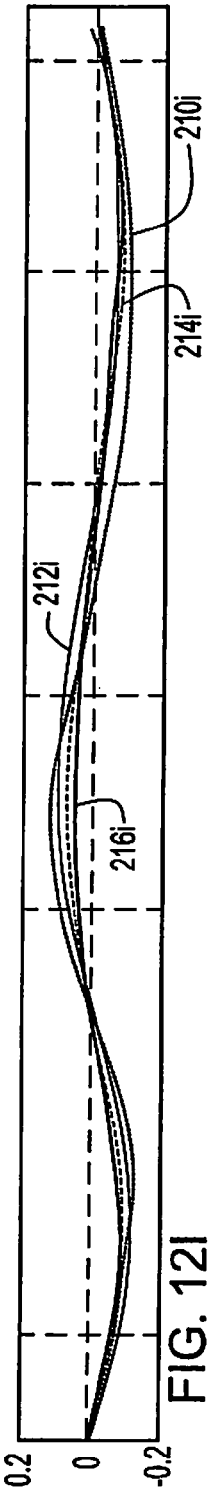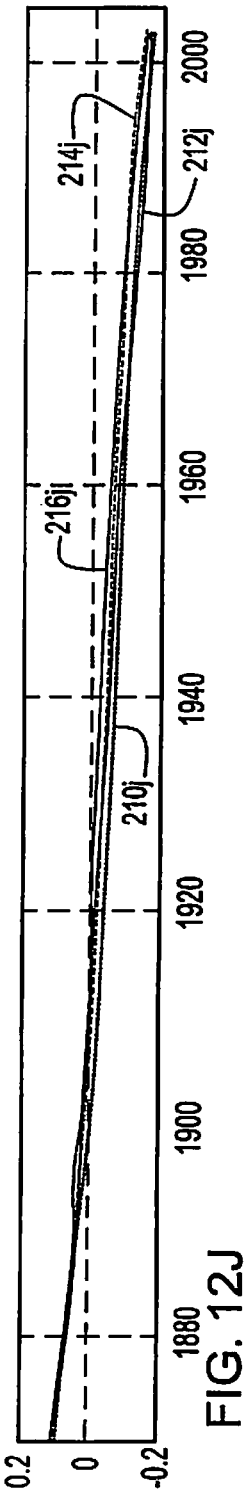
FIG. 12F
FIG. 12G
FIG. 12H
FIG. 12I
FIG. 12J

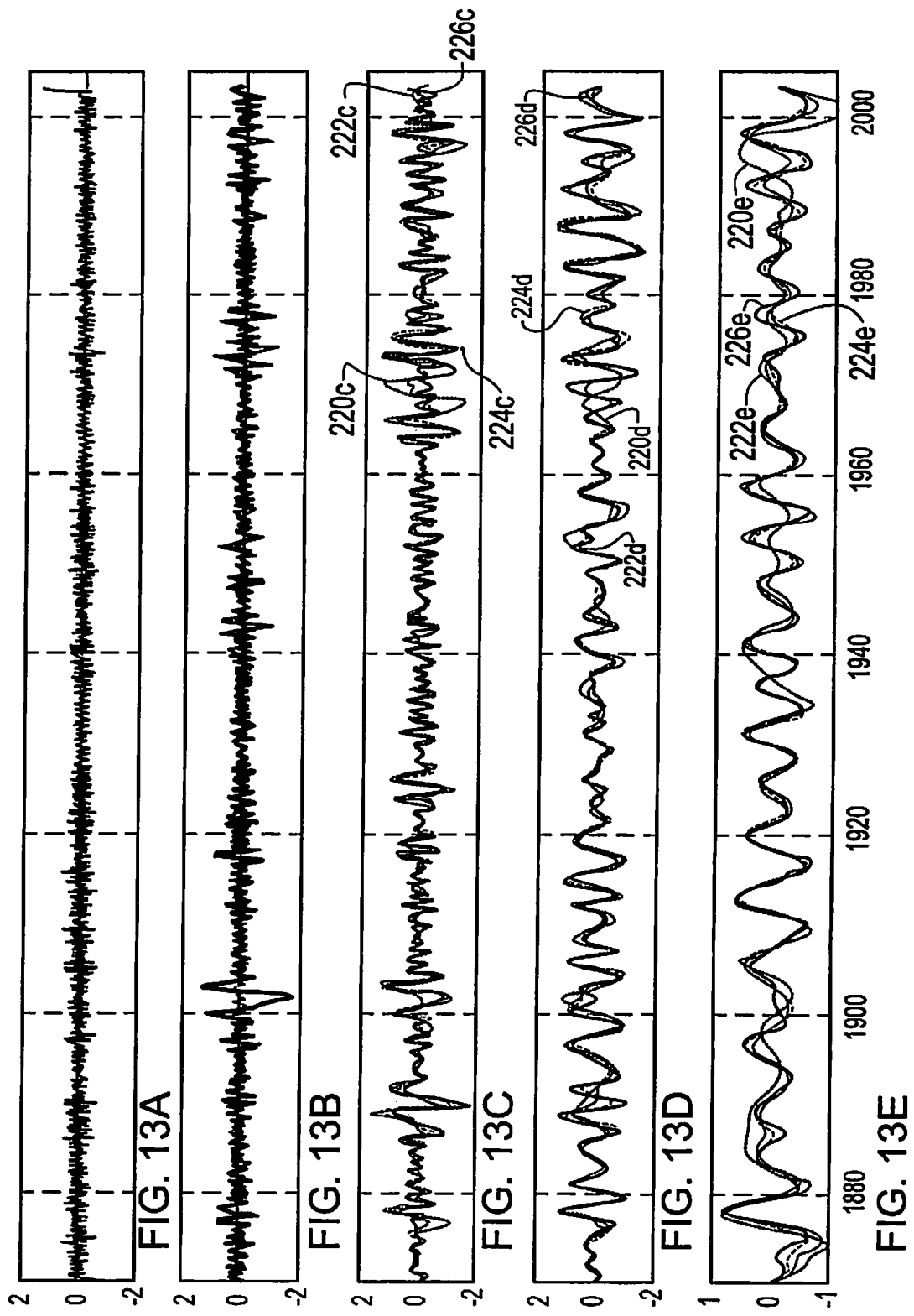

NOISE-ASSISTED DATA ANALYSIS METHOD, SYSTEM AND PROGRAM PRODUCT THEREFOR

ORIGIN OF THE INVENTION

The invention described herein was made by an employee of the United States Government, and may be manufactured and used by or for the Government for governmental purposes without the payment of any royalties thereon or therefor.

BACKGROUND OF THE INVENTION

1. Field of the Invention

The present invention is generally related to a data and signal analysis method, apparatus and article of manufacture and more particularly to an apparatus, article of manufacture and analysis method for isolating and extracting useful data from mixed mode signals.

2. Background Description

Any complex signal is composed of a number of individual components at various frequencies. So, even a sporadic signal may be generated by combining multiple fundamental and unrelated components. Thus, given the fundamental frequencies for included components included in a complex signal, the embedded components can be extracted fairly easily, e.g., using band pass filtering. Unfortunately, the fundamental frequencies are seldom known for complex natural signals. Consequently, component scale selection is a normal problem encountered with signal analysis.

Empirical Mode Decomposition (EMD) is time-based data analysis method that has been used extensively for data in identifying information in complex data/signals. EMD is used to extract the information from the complex signals and, further, for analyzing the extracted information. Specifically, applying EMD to a signal distills intrinsic components, known as Intrinsic Mode Function (IMF) components or IMFs, each, ideally, based in a single scale that might contain the fundamental signal components and the harmonics contained in the original signal. Thus, the IMFs may be recombined to accurately reconstitute the original signal.

Frequently, one can use the IMFs to identify useful information underlying or hidden in the original signal. Thus, EMD has proven particularly useful as an adaptive time-frequency data analysis method, and has proven to be quite versatile in a broad range of applications, e.g., extracting information from noisy nonlinear signals and data collected from non-stationary processes. One point where EMD has not proven particularly effective occurs with signals that contain intermittencies, which produce mixed mode decomposition.

Complex signals can include sporadic signal oscillations that may be of dramatically disparate frequencies and amplitudes that arise from intermittent and unrelated driving mechanisms. Decomposing these complex signals with EMD may result in IMFs that appear jumbled together and some IMFs may have no physical meaning by themselves. For example, some IMFs may falsely suggest that the original complex signal includes different physical processes that are represented in the mixed modes. Heuristically, for example, one can constitute a complex signal from known sporadic or intermittent source signal components, and then apply EMD to the result. The extracted IMFs do not match the original components.

In addition to producing individual IMFs that are devoid of physical meaning, the intermittence in such a complex signal also causes serious aliasing in the time-frequency distribution. Aliasing irrecoverably damages any clean scale separation between IMFs. Mode mixing has been addressed to some degree using a final time-frequency-projection. Unfortunately, even using a final time-frequency-projection, aliasing still occurs in the IMFs at each transition from one scale to another (i.e., from an intermittent signal starting/stopping). Also, state of the art intermittence tests are being used to ameliorate some of these problems.

However, intermittence tests are not trouble free. First, in using an intermittence test EMD ceases being totally adaptive, because typical intermittence tests are based on a subjectively selected scale. Artificially selecting that scale adds external constraints to the EMD that colors the resulting IMFs. Second, most natural or manmade signals have scales that are not clearly separable but continuously mixed over some range. So, subjectively selected scales only work for EMD when the complex signal includes clearly separable and definable time scales. Since complex signals seldom include such clearly separable and definable time scales, typical intermittence tests seldom work well with EMD, if they work at all.

Consequently, these prior approaches have not proven particularly effective, especially for complex data with variable but continuously distributed scales, i.e., signals where no single intermittence test criterion can be selected. Furthermore, since most subjectively pre-selected criteria lack physical justifications, EMD is rendered non-adaptive and unstable. This instability is because any small perturbation in the starting data can result in a different set of IMFs. Thus, EMD usefulness has been severely impaired for application to complex signals with inherent scale intermittence, especially for extracting from mixed mode signals underlying information contained in signals with similar scales.

Thus, there is a need for tools that are capable of extracting meaningful data from complex signals, and especially, from mixed mode signals containing intermittent signal components.

SUMMARY OF THE INVENTION

Accordingly, embodiments of the present invention provide means to extract meaningful information from complex signals;

Embodiments of the present invention also provide means to extract signal components from complex signals that are free of mode mixing;

Additionally, embodiments of the present invention provide means to extract single scale signal components with uniform time scales within each component from complex signals;

Further, embodiments of the present invention provide a means to decompose natural single scale signal components with nearly uniform time scales within each component from complex signals;

Still further, embodiments of the present invention provide a means to naturally decompose complex signals into single scale signal components with near uniform time scales within each component and without resorting to a priori subjective selection criteria.

The present invention relates to an apparatus, computer program product and method of analyzing complex or mixed mode signals. Generally, the method includes the steps of; collecting a data representation of a complex signal; generating a plurality of independent versions of the complex signal; extracting intrinsic mode functions (IMFs) for each of the independent versions, wherein the IMFs are indicative of intrinsic oscillatory modes in a corresponding independent version; and combining corresponding IMFs extracted from each of the independent versions wherein the combined IMFs form ensemble IMFs (EIMFs).

BRIEF DESCRIPTION OF THE DRAWINGS

The foregoing and other features will be better understood from the following detailed description of embodiments of the invention with reference to the drawings, in which:

FIGS. 2A-D show an example of application of EMD through a sifting process to decompose a representative mixed mode signal verses time;

FIGS. 4A-H show an example of decomposition of a single noise supplemented amalgamation signal of the mixed mode signal;

FIGS. 5A-H show the IMF components combined into amalgamation signals, where the number of ensemble members, N=50, and the added noise has a standard deviation amplitude ($\mathring{a}_n$) of 0.1;

FIGS. 7A-B, show data representative of the El Niño-Southern Oscillation (ENSO) phenomenon from 1870-1930 and 1930-2000, respectively;

FIGS. 8A-J show IMFs resulting from application of EMD to the SOI and CTI indices;

FIGS. 10A-J show the results of EEMD on the SOI and CTI indices with $\mathring{a}_n$=0.4 and N=100;

FIGS. 12A-J show a comparison of results of adding different levels of noise on resulting SOI EIMF components;

FIGS. 13A-J show a comparison of results of adding different levels of noise on resulting CTI EIMF components;

DETAILED DESCRIPTION

Figure 1A:
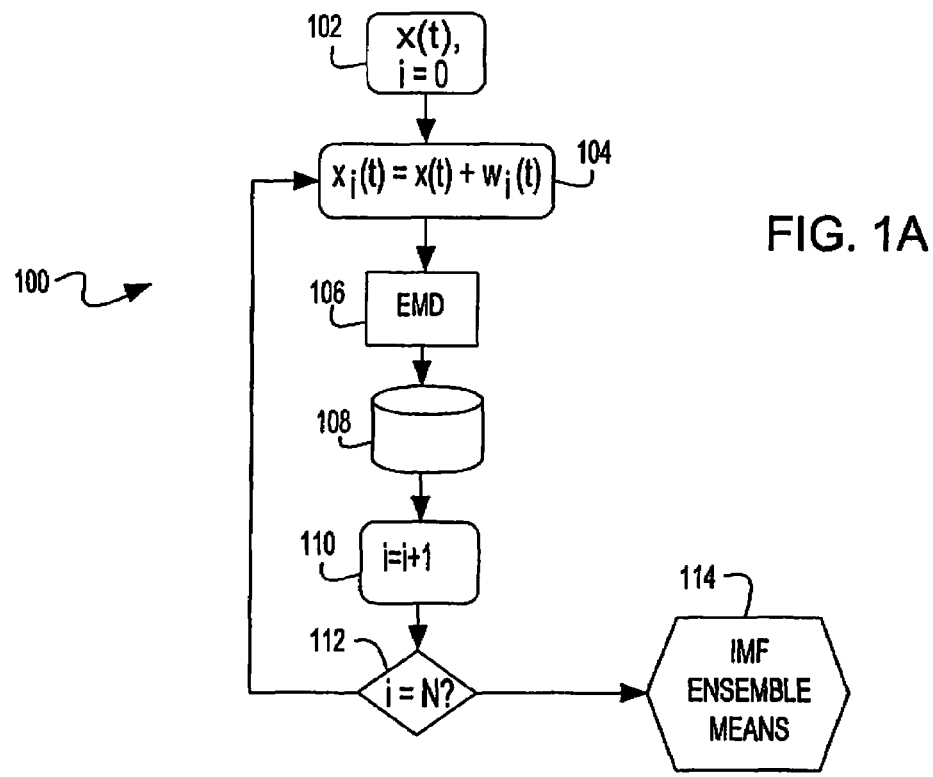
FIGS. 1A-1B show examples of mixed mode signal analysis, iteratively and in parallel, according to one embodiment of the present invention.
Figure 1B:
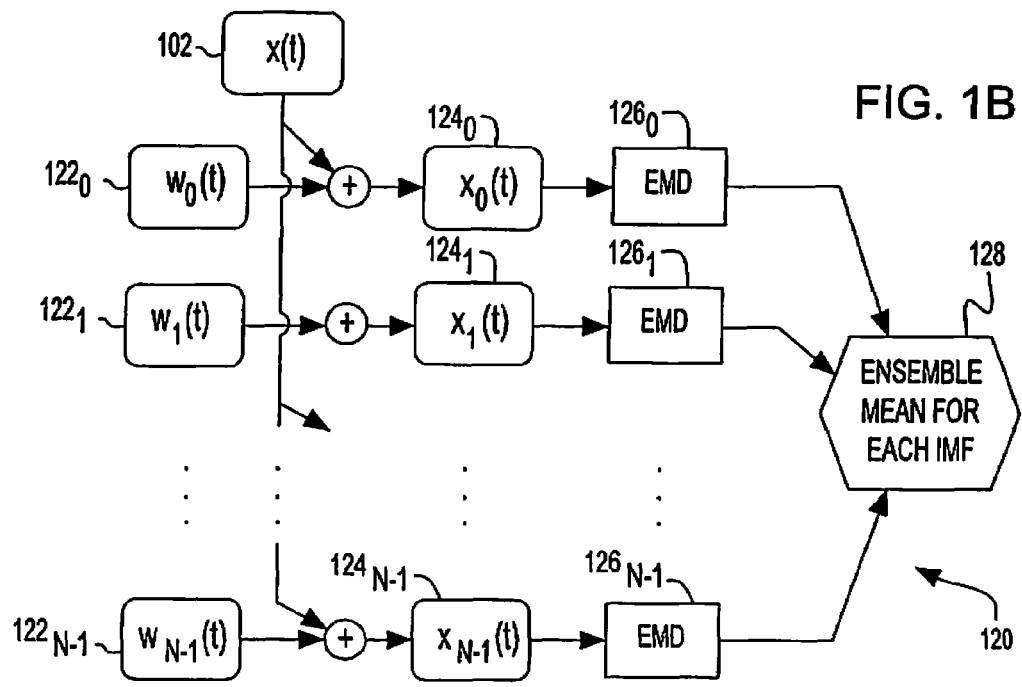
Figure 3A:
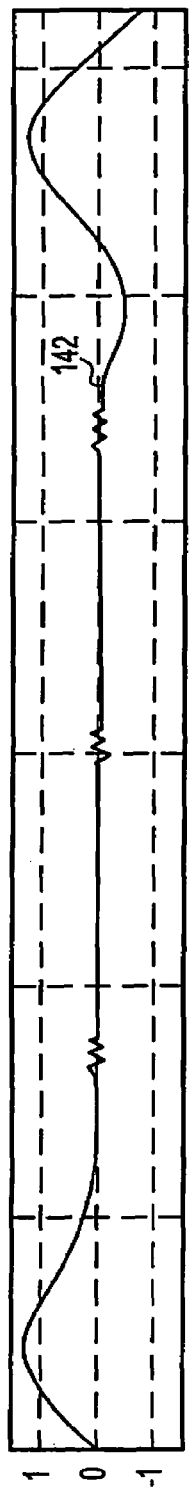
FIGS. 3A-D show the actual components and residue that combine to result in the original signal.
Figure 3B:
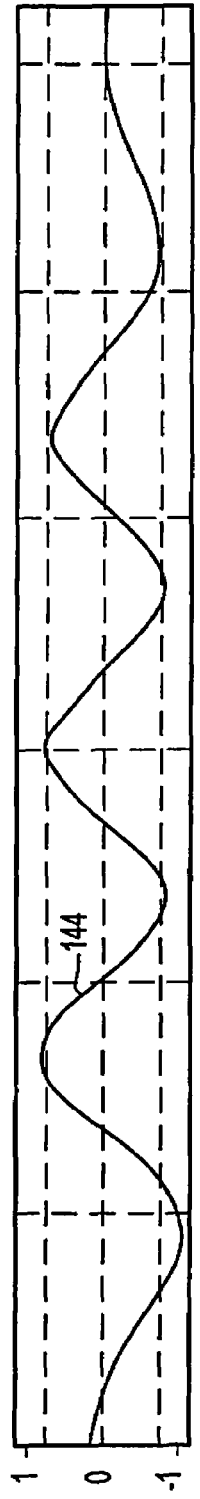
Figure 3C:
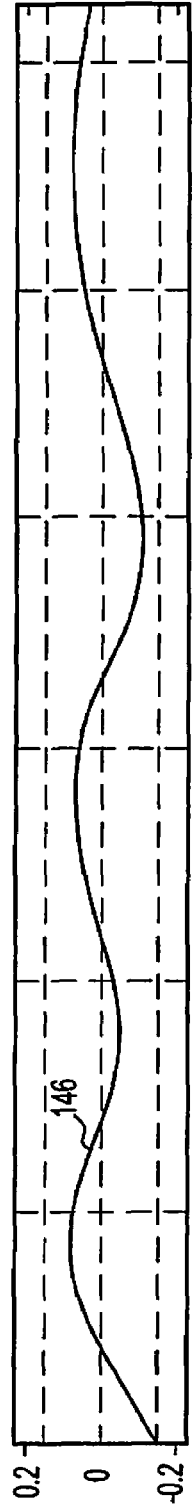
Figure 3D:
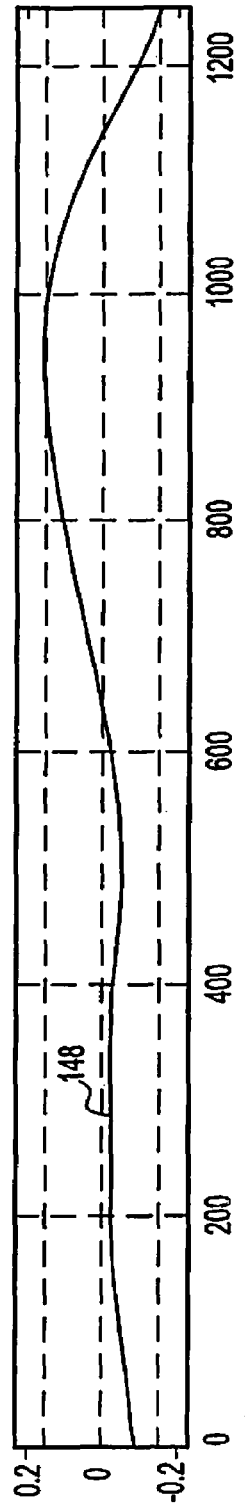

Turning now to the drawings and more particularly FIGS. 1A-B which show iterative and parallel examples of mixed mode signal analysis according to one embodiment of the present invention. The present invention may serve as a dyadic filter for various types of noise that filters information of a similar scale to within single individual Intrinsic Mode Function (IMF) components with the scale for each IMF component being self-defined by extracting that particular component. Multiple (N) individual versions are generated (or collected) from the same mixed mode signal, x(t). Each individual version may be generated by combining the mixed mode signal with white noise ($w_i(t)$), a different instance of white noise for each version, $xi(t)=x(t)+w_i(t)$; or collected, for example, by separate observations, each of which contains different noise. Then, each individual version may be decomposed using Empirical Mode Decomposition (EMD) in Noise-Assisted Data analysis. For an example of generating IMF components, or IMFs, e.g., using the Hilbert Huang Transform (HHT) in Empirical Mode Decomposition (EMD), see, e.g., U.S. Pat. No. 5,983,162, entitled "Empirical Mode Decomposition," to Norden E. Huang, assigned to the assignee of the present invention and incorporated herein by reference in its entirety.

EMD may effectively filter each signal version, $x_i(t)$, to extract simple oscillatory IMFs, $c_j(t)$, in a manner analogous to electrically filtering harmonics or sifting sand with a mechanical sieve to separate aggregated sand particles according to their physical size. So, each signal version may be decomposed into a series of components according to component time scales with each component being an IMF for that particular version. Each component may have varying amplitude and frequency, wherein: the number of extrema and the number of zero-crossings may either be equal or differ at most by one; and at any data location, the mean value of the envelope defined by the local maxima and the envelope defined by the local minima is zero. Thus, applying EMD to each particular signal version, each version may be described as the sum of the resulting IMFs with the form $$x_i(t) = \sum_{j=1}^{n} c_{ij}(t) + r_{in},$$

where $r_{in}$ is the residue of data version $x_i(t)$, after extracting all n IMFs. Once IMFs have been generated for all of the versions, the N corresponding IMFs for each version may be combined in an ensemble IMF (EIMF) for each mode, e.g., by taking an unweighted average (i.e., the mean) of the N IMF sets to derive the EIMFs. Thus, the mean of the corresponding individual IMFs from this Ensemble EMD (EEMD) result in a much clearer, truer representation of the data contained in the original mixed mode signal.

So, in step 102 of the iterative extraction example 100 of FIG. 1A, complex signal data x(t) may be collected and passed to EEMD. The complex signal data x(t) may be from any simple or complex signal such as, for example, monitoring climate change conditions or digitized speech data. Also, at this point an iteration counter (i) may be initialized. The iteration counter counts the number of different versions of x(t). In step 104, the signal (x(t)) is combined with a first instance of white (or fractional Gaussian) noise ($w_i(t)$) of magnitude a) to generate the first amalgamated version of the signal ($x_i(t)$). So, in this first iteration or pass, $x_1(t)=x(t)+w_1(t)$, such that subsequent to step 104 all data may be amalgamations of signal and noise. In step 106 the current signal version may be decomposed using EMD to generate IMFs, where each IMF has the form $c_{j-1}(t)=c_j(t)+r_{j-1}(t)$. The IMFs may be stored in step 108 for a subsequent mean IMF determination, i.e., generating the EIMFs. In step 110 of this example, the iteration counter may be incremented. Of course the iteration counter may be incremented at any point subsequent to step 104. In step 112, a check of the iteration counter determines if the desired number (N) of signal versions have generated and decomposed into individual IMFs. The number (N) of versions of the signal may be pre-selected at a specific number or default or selected on a case by case basis and adjusted by the affect of N on the resulting EIMFs. As N approaches infinity, the EIMFs approach true components, i.e., $$c_j(t) = \lim_{N \to \infty} \frac{1}{N} \sum_{k=1}^{N} \{c_j(t) + \alpha r_k(t)\}.$$

Once it is determined in step 112 that the IMF components have been extracted for the last of the N signal versions, an IMF mean component or EIMF is determined in step 114 for each corresponding component of the extracted IMFs.

EEMD may generally be described as a controlled repeated extraction and final mode assembly that produces a single ensemble mean (EIMF) 114 for each component of a mixed mode signal. EEMD operates somewhat analogous to collecting samples of a signal from different realizations of the same test; adding the original signal (x(t)) to multiple unique white noise samples provides multiple unique and pseudo-independent representations of the same signal to uniformly populate the whole time-frequency space for each. Taken individually, each pseudo-independent signal version may be very different than every other version. So, each sifting 106 produces different, very noisy results, i.e., a unique set of IMFs. Thus, the different instances of white noise in different signal versions assure that corresponding IMFs of different series are not correlated with each other, i.e., have an auto-correlation function that is zero for the white noise. Further, this added white noise decomposes within the IMF components constituting with different uniform time scales and that are subsequently separated from the EIMF components by the effective filter bank. Thus, for m IMFs in each EMD, any discrepancy (Δ) remaining in the final EIMFs with the true or expected result (E {cn(t)}) may be determined by $$\Delta = \sum_{j=1}^{m} \left( \sum_i (E\{cn_j(t)\} - cn_j(t))^2 \right)^{1/2}.$$

Because EMD operates in the time domain, the uncorrelated white noise series embedded in the individual corresponding IMFs tend to self-cancel each other in the resultant EIMFs, i.e., in the means of the individual IMFs. Thus, by adding noise with finite rather than infinitesimal amplitude, sifting to extract IMFs from each and combining each group of corresponding IMFs into an EIMF, individual differences tend to be eliminated from the ensemble mean (i.e., the EIMF), especially for a large enough N. Thus, selecting the number of versions, N, can mitigate any residual effect of the added white noise.

In particular, the final deviation (å) of the error signal (the difference between input signal components and the corresponding EIMFs) decreases with the ratio of the amplitude of the added noise ($\epsilon$) and N, following the well-established statistical relationship rule: $å_n = \epsilon/\sqrt{N}$, or $å_n + (\epsilon/2)\ln(N) = 0$. Accordingly, the true and physically meaningful answer is not an IMF without noise or multiple zero crossings, i.e., the residue. Instead, it may be the ensemble mean (EIMFs) of a large number of corresponding IMFs that may be extracted from the noise-amalgamated signal.

Further, different scale signals reside in each corresponding IMF for each individual signal, dictated by the dyadic filter banks. The different signal scales automatically project onto proper reference scales that may be established by the added white background noise. All of the scale space for the signal may be uniformly filled with the added noise 104, to facilitate eliminating artifacts in the IMFs from mode mixing and force exhausting all possible solutions for true ensemble components. Thus, the resulting ensemble mean may be much more meaningful than the simple residue, which may provide completely false information. So, with the noise from the IMFs removed, only the signal survives and persists in the EIMFs. Thus, EIMFs resulting from EEMD show a major improvement over IMFs extracted merely through EMD.

FIG. 1B shows an alternate parallel example, wherein the signal 120 may be combined with N instances of white noise ($w_0(t)$, $w_1(t)$ . . . , $w_{N-1}(t)$) from noise sources $122_0$, $122_1$, . . . , $122_{N-1}$ to generate N versions $124_0$, $124_1$, . . . , $124_{N-1}$ of the signal ($x_0(t)$, $x_1(t)$ . . . , $x_{N-1}(t)$). Each signal versions $124_0$, $124_1$, . . . , $124_{N-1}$ may be decomposed in a corresponding EMD unit $126_0$, $126_1$, . . . , $126_{N-1}$. Individual corresponding IMFs are combined in an ensemble unit 128 to generate EIMFs, which are treated as the true result. By increasing N to include more and more trial results in the ensembles, the added noise self-cancels more effectively.

Since the added white noise self-cancels in a time-space ensemble mean only the signal 102 survives and persists in the final ensemble mean. Thus, the true and physically meaningful answer of the EMD is not the one without noise; rather, it may be designated the ensemble of a large number of trials resulting from extracting EIMFs from the noise-added or noise supplemented signal. Further, although described herein in terms of mixed mode signal analysis of a single mixed mode signal, the present invention has application to analyzing any simple or complex signal regardless of whether from multiple or a single measurement vantage point, or whether the underlying signal is continuous, intermittent, sporadic, periodic, aperiodic or otherwise. As also described herein and for example only, a typical suitable computer or personal computer (PC) applies EEMD to data collected and stored in a suitable digital format. The data may be stored locally, or remotely and provided (e.g., over the Internet) as needed for EEMD. The advantages of EIMFs over IMFs can be better appreciated by application of EMD and EEMD to a representative mixed mode signal.

Thus, FIGS. 2A-D show an example of application of EMD through a sifting process to decompose a representative mixed mode signal 130. In this example, the signal 130 has a sinusoidal unit amplitude wave with a superimposed, intermittent high-frequency low-amplitude signal that may be approximately 10% of the sinusoidal wave. From any data, $r_{j-1}$, the sifting begins by identifying all the local extrema (the combination of both maxima and minima), including local maxima. In this example, fifteen (15) local maxima may be identified with thirteen (13) intermittent signal maxima 132 and fundamental signal maxima 134. Then, connecting all these local maxima 132, 134 (and minima), e.g., with a cubic spline, the upper envelope 136 and lower envelope 138 are determined and, also, the mean 140 of the upper envelope 136 and lower envelope 138. Thus, as a result of mode mixing, the upper envelope 136 resembles neither the flat line upper envelope of the fundamental (not shown), nor the upper intermittent fundamental (also not shown). Rather, the upper envelope 136 may be a severely distorted combination of both. The first extracted IMF component (i.e., using EMD) is the difference between the input 130 and the mean 140.

FIGS. 3A-D show IMF components 142, 144, 146 and residue 148 that extracted from the original signal 130. Because the upper envelope 134 may be severely distorted by the intermittency of the sporadic signal, the first IMF component 142 provides an initial guess that may be the mixture of both the low frequency fundamental IMF component (not shown) and the high frequency intermittent signal. This high frequency intermittent signal makes the results more difficult to interpret and also makes it more difficult to identify the underlying physical processes. This first component 142 may be treated as data for sifting in the next iteration. So, sifting continues until the resulting component has extrema envelopes that are symmetric with respect to a zero mean under certain selected criteria. The sifting ends with a monotonic function, i.e., the residue, $r_n$, from which no more IMF can be extracted. Similar to this application of EMD to the original signal, according to one embodiment of the present invention, multiple instances of white noise are added to the original signal 130 to generate multiple unique instances of the signal 130. Then, EMD may be applied identically to each version to generate IMFs for each noise supplemented version. Finally, corresponding IMFs are combined to generate EIMFs.

Figure 4E:
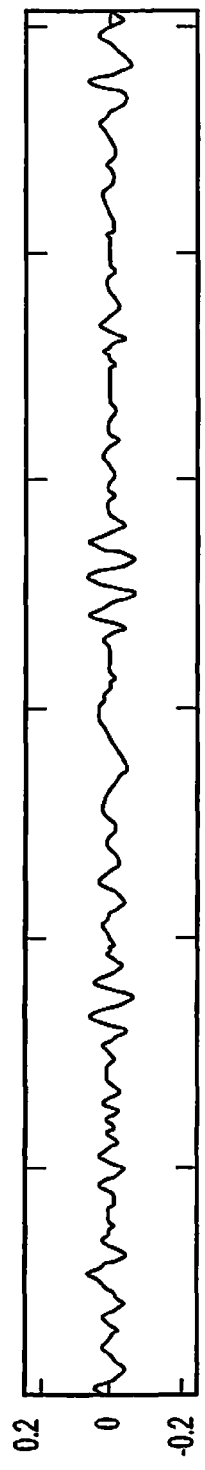
Figure 4F:
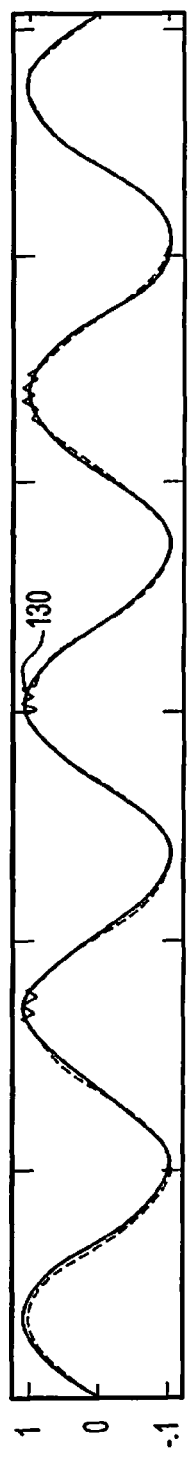
Figure 4G:
Figure 4H:
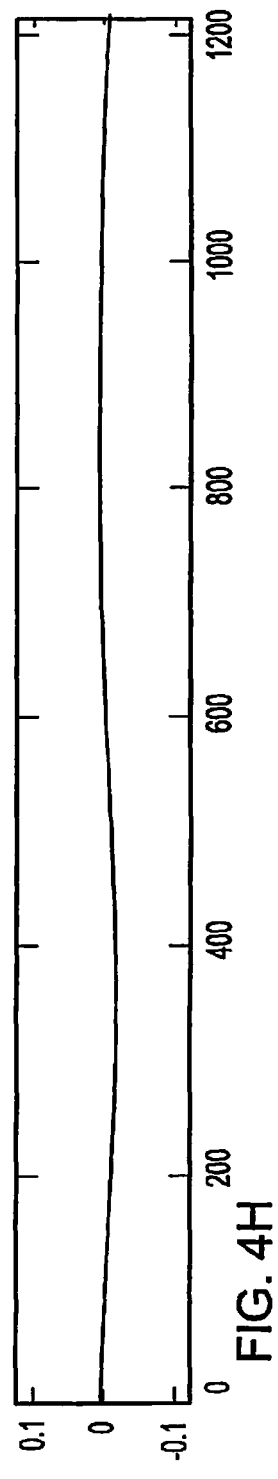

FIGS. 4A-H show an example of application of EMD to decompose a single noise supplemented amalgamation signal 150, i.e., a noise supplemented version of the mixed mode signal 130 of FIG. 2. While the noise being added to the signal is not specifically shown, it is apparent that the noise may be superimposed on the original signal 130 in this signal version 150. Further, this noise supplemented or amalgamation signal 150 decomposes into 6 components and a residue instead of just the three components and residue of the original signal of FIGS. 3A-D. In this example, the added noise may have an amplitude that is 0.1 standard deviation of the original signal. FIG. 4F shows the original mixed mode signal 130 superimposed over the fifth component, which is substantially the sinusoidal wave component of the original signal 130 without the 13 intermittent signal extrema. In this example, high frequency components remain buried in noise, but the low frequency component of FIG. 4G is already extracted almost perfectly. While decomposing this single version 150 alone may yield less usable data than could be gleaned from decomposing the original (FIGS. 3A-D); these IMFs are just the results from but one noise supplemented instance of the signal, which may be combined with N others in the preferred embodiment EEMD.

Figure 5A:
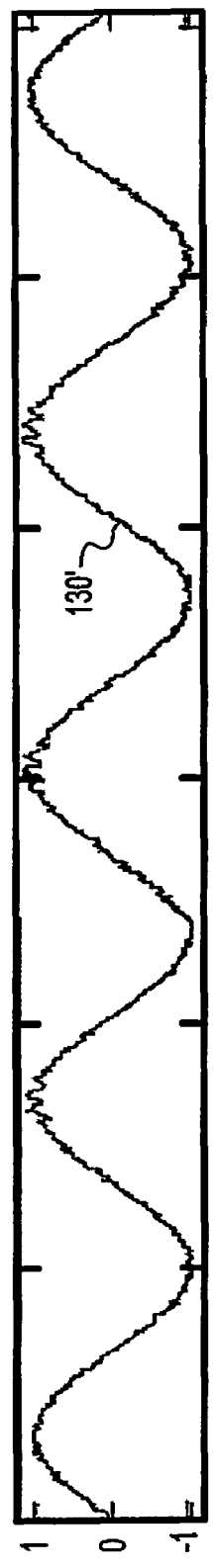
Figure 5B:
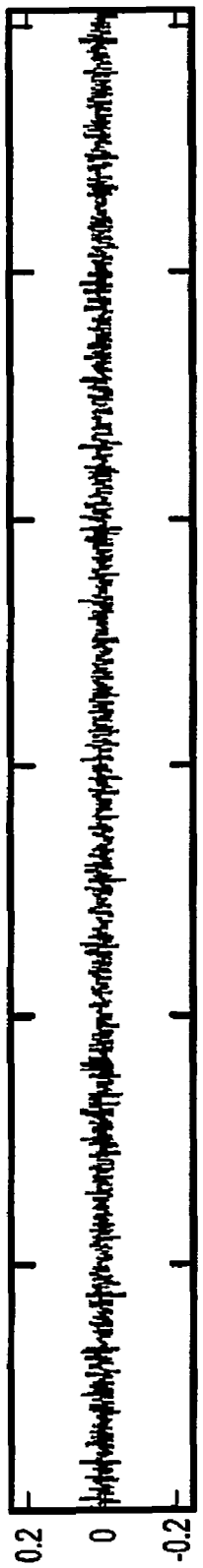
Figure 5C:
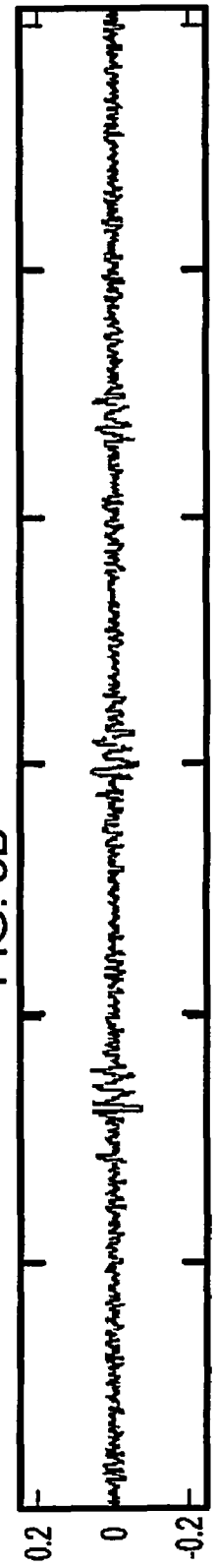
Figure 5D:

FIGS. 5A-H show an example of EIMFs from combining the corresponding IMF components of FIGS. 4A-H with 49 more such sets of IMF components extracted from 49 amalgamation signals, i.e., N=50. So, 49 more different instances of white noise (e.g., from 49 different random number seeds or time delayed with 49 different delays) are added to the original signal for each ensemble member. Each instance of added noise may have an amplitude that is 0.1 standard deviation of the original data. So, FIG. 5A shows the mean of the noise modified input 130' with the original input 130 included in FIG. 5F for comparison. It should be noted that increasing the number (N) of ensemble members, facilitates uncovering high frequency intermittent signal components, e.g., as shown in FIGS. 5C and 5D. Thus, intermittent signal components become apparent or, at least, are more clearly defined from these two components by combining the corresponding components. Also, the fundamental signal in FIG. 5F is a nearly perfect match for the fundamental component 144 of FIG. 3B.

Figure 6:
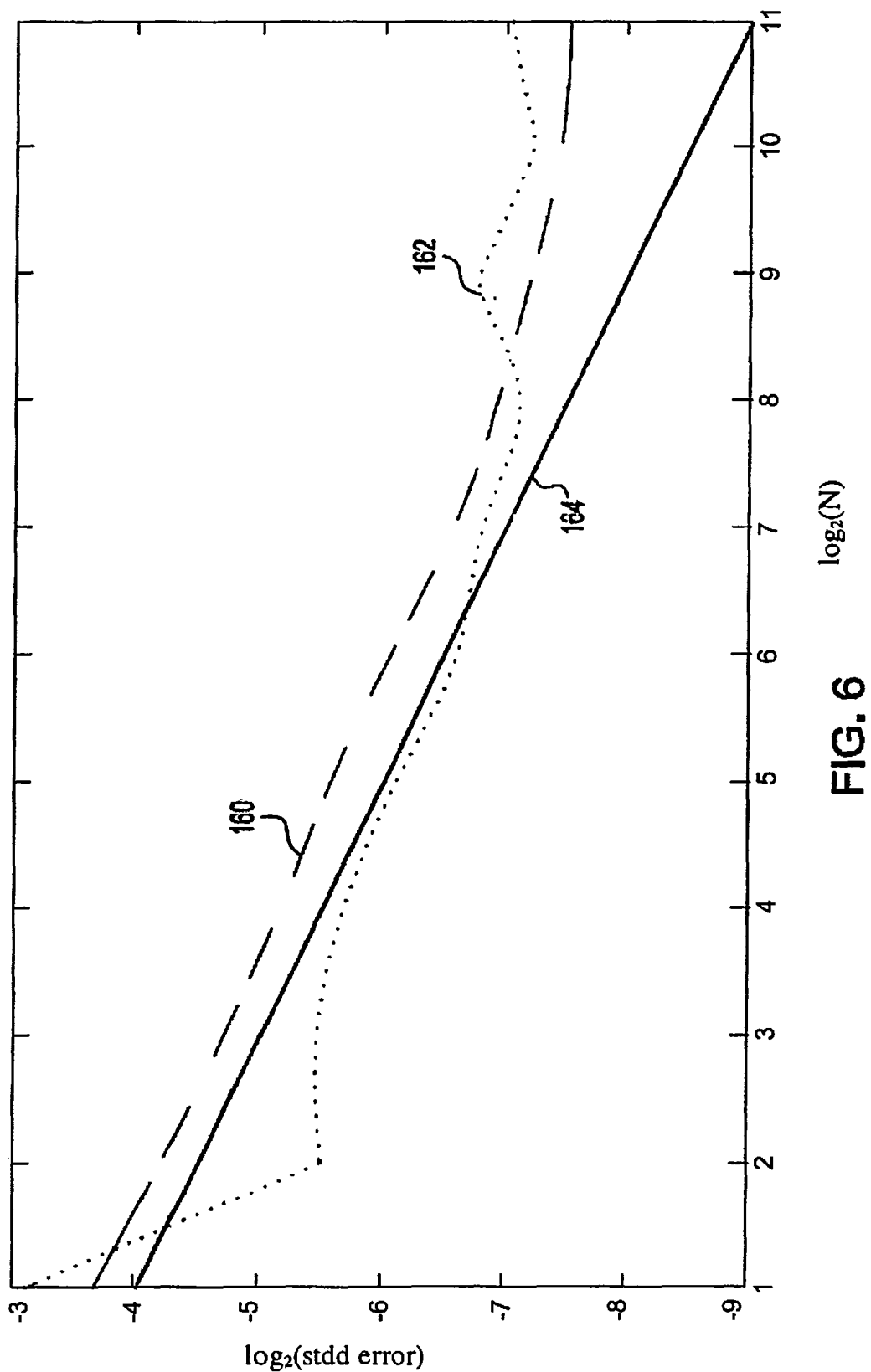
FIG. 6 shows an example of the effect of N on $\mathring{a}_n$, comparing both the high frequency intermittent signals and the low frequency fundamental signals against theoretical with arbitrary vertical location.

FIG. 6 shows an example of the effect of the number of ensemble members (N) on error standard deviation ($å_n$), comparing both the high frequency intermittent signals 160 and the low frequency fundamental signals 162 against theoretical 164 with arbitrary vertical location. Generally, the results 160, 162 agree well with the theoretical 164. The relatively large deviation for the fundamental signal 162 from the theoretical 164 may be understood as the large error spread for low frequency signals. However, this large error spread may be further reduced to a negligible level by increasing the number of ensemble members.

By contrast, if the added noise amplitude is not large enough, the extrema may not change, perceptibly, from version to version, which is necessary for extracting the signal using EEMD. Accordingly, by adding multiple instances of finite amplitude noise to the complex signals or real life data prior to extraction, underlying signal components may be extracted. Having demonstrated the basic approach, additional examples will facilitate understanding application of the present invention FIGS. 7A-B, show an example of representative data collected on the interaction in the air-sea system in the tropics, known as the El Niño-Southern Oscillation (ENSO) phenomenon from 1870-1930 and 1930-2000, respectively. The Southern Oscillation (SO) is a global-scale seesaw in atmospheric pressure between the western and the southeastern tropical Pacific; and, the El Niño refers to variations in temperature and circulation in the tropical Pacific Ocean. The two systems are known to be closely coupled, and together produce important climate fluctuations. These fluctuations are known to have a significant impact on weather and climate over the globe as well as attendant social and economic consequences. The underlying physics of ENSO are also well known.

Frequently, the Southern Oscillation is represented by the Southern Oscillation Index (SOI) 170. The SOI 170 is a normalized monthly sea level pressure index based on the pressure records collected in Darwin, Australia and Tahiti Island in the eastern tropical Pacific. It should be noted that the Tahiti record used for the calculation of the SOI 170 is less reliable than that from Darwin but, contains otherwise data missing from Darwin prior to 1935.

The Cold Tongue Index (CTI) 180 is a good representation of El Niño. In particular, the CTI 180 is the average large year-to-year Sea Surface Temperature (SST) anomaly fluctuations over 6°N-6°S, 180-90°W, due to the relatively colder SST with respect to the surrounding area during an El Niño event. A large negative peak in the SOI 170, which often happens with a two to seven year period, corresponds to a strong El Niño (warm) event. With its rich statistical properties and scientific importance, the SOI 170 is one of the most prominent time series in the geophysical research community and has been well studied. Thus, multiple prior approaches have been taken to extract useful scientific information from this El Niño time series.

In the present example, time scales are identified over which the El Niño and the Southern Oscillation are coupled. It should be noted that because of the infrequent and low quality observations in the early stages of FIG. 7A, the two indices show less consistency and their inter-relationship less reliability in the early stages. This lack of consistency is reflected in that the overall correlation between the two time series is −0.57 for the whole data length of both FIGS. 7A and B, that drops to only −0.45 for the early measurements in FIG. 7A, but jumps to −0.68 for the more recent in FIG. 7A.

FIGS. 8A-J show IMFs resulting from application of EMD to the two indices 170, 180 of FIGS. 7A and B, showing IMFs 170a-i and the trend 170j of the SOI 170 and IMFs 180a-i and the trend 180j of the CTI 180. To facilitate identifying synchronization, the ordinate axis is inverted for the CTI 170 and its components 170a-j.

Figure 9:
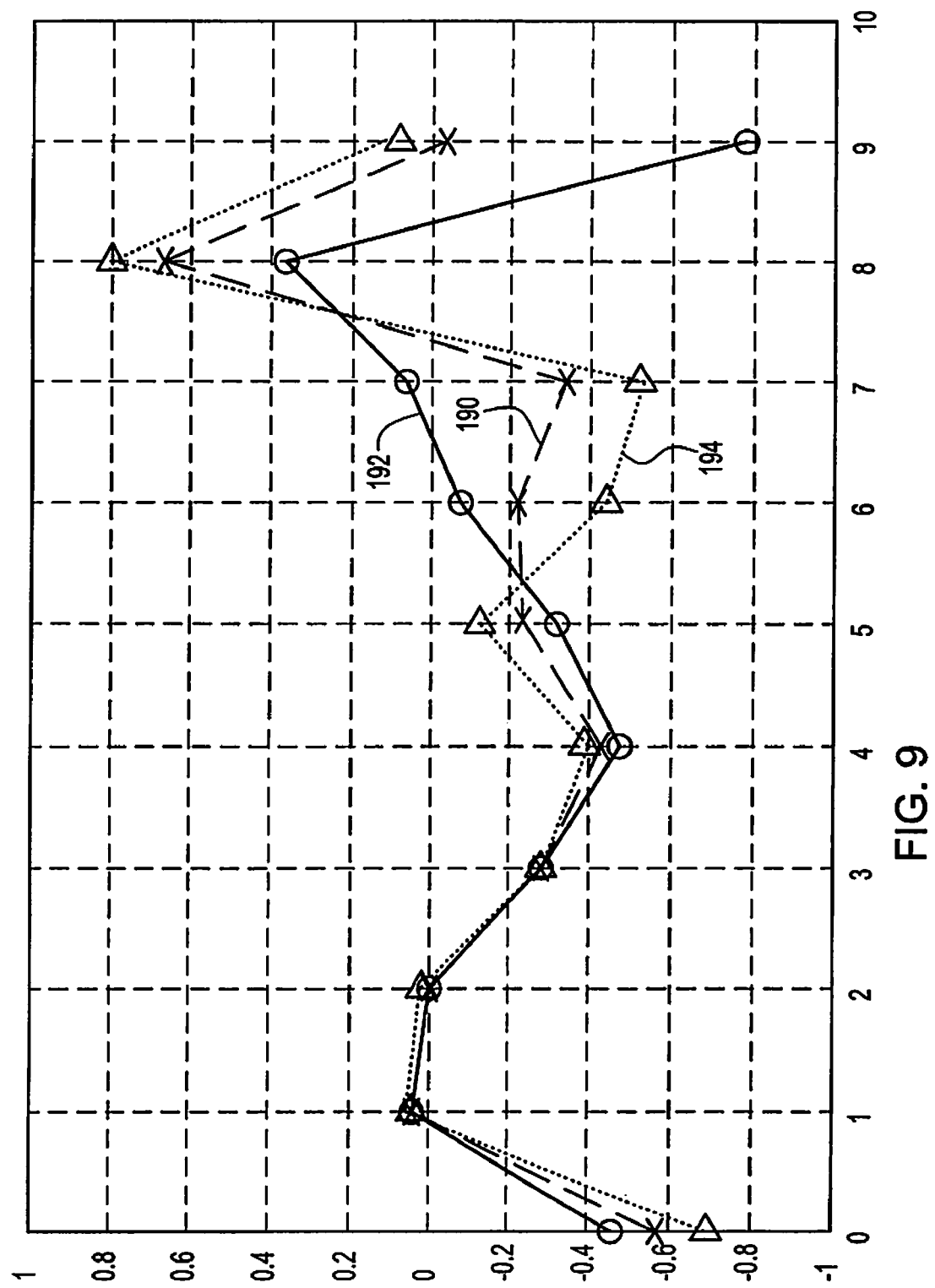
FIG. 9 shows a comparison of correlation coefficients of the SOI and CTI and corresponding over the first period, the final period and the entire period.
Figure 10F:
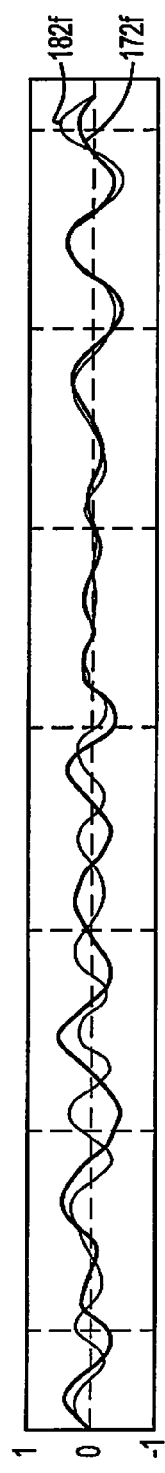
Figure 10G:
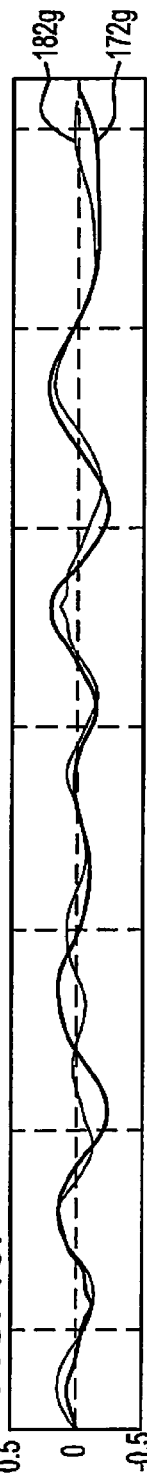
Figure 10H:
Figure 10I:
Figure 10J:
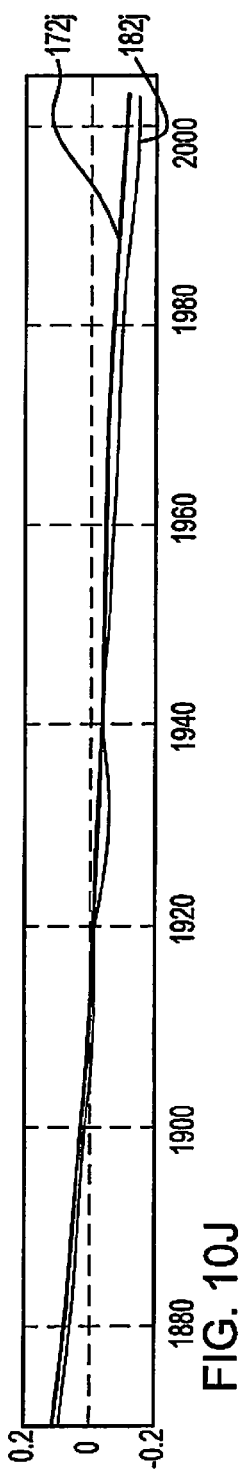

FIG. 9 shows a comparison of correlation coefficients (ordinate axis) of the SOI 170 and CTI 180 and corresponding IMFs 170a-j, 180a-j, over the entire period 190, the early period 192 of FIG. 7A and the more recent period 194 of FIG. 7B. Component numbers along the coordinate axis correspond to each IMF component with the original signals indicated by 0. While the SOI 170 and CTI 180 have a quite large correlation (−0.57), their IMFs 170a-j, 180a-j show little corresponding synchronization. For the early time period, the largest negative correlation amongst the IMFs 170a-j, 180a-j is only −0.43, a much smaller value than that of the correlation between the whole collected data of SOI 170 and CTI 180. Since the underlying physical processes that dictate the large scale interaction between atmosphere and ocean differ on various timescales, normally, the decomposition is expected to identify such variations. Further, the low correlation between corresponding IMFs in this example, indicates that using EMD on SOI 170 and CTI 180 provides little or no help in identifying and understanding which times scales are more prominent for this example, i.e., which times scales indicate climate system coupling between atmosphere and ocean in the tropics.

This lack of correlation is representative of problems encountered using EMD in mixed mode signal analysis. It is apparent from the example of FIGS. 8A-J, that in almost any high or middle SOI IMF 170a-f or CTI IMF 180a-f, segments of oscillations have bleed-through signals of approximate periods that correspond to those in neighboring IMFs. This bleed-through is also contagious in that, if it occurs in one IMF 170a-e, 180a-e, it is likely to occur in following IMFs 170b-f, 180b-f, and at the same temporal neighborhood. EEMD overcomes this mode mixing that impairs the capability of prior art approaches of identifying the true time scales of consistent coupled oscillations in the individual IMF components 170a-g, 180a-g in the ENSO system. Thus in this example, the original full data 170, 180 have a higher correlation than any of the IMF pairs from the first 7 components 170a-j, 180a-j.

Figure 8A:
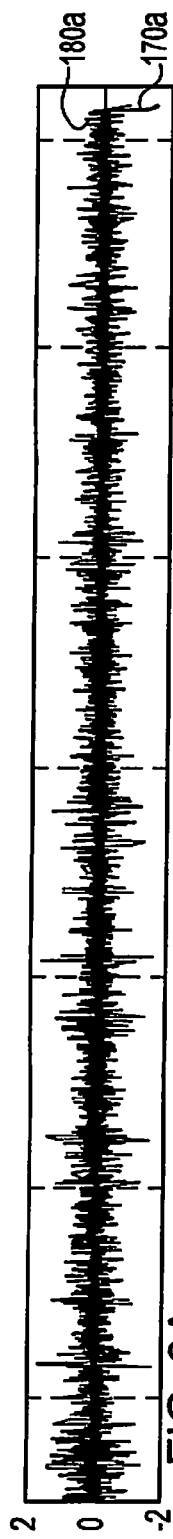
Figure 8B:
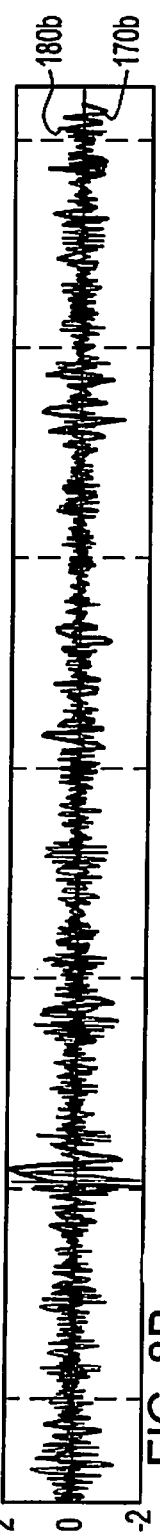
Figure 8C:
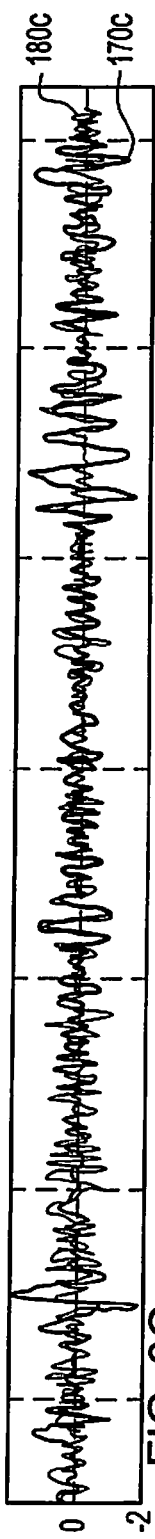
Figure 8D:
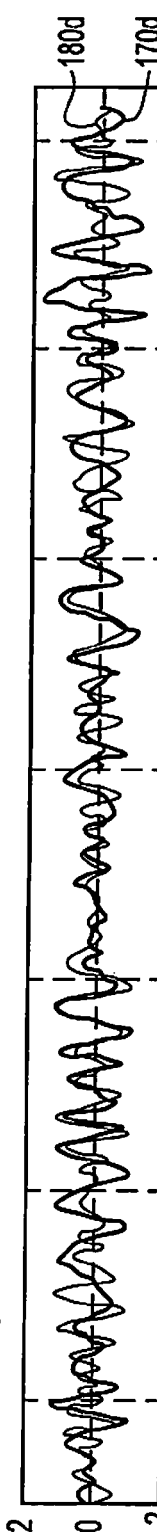
Figure 8E:
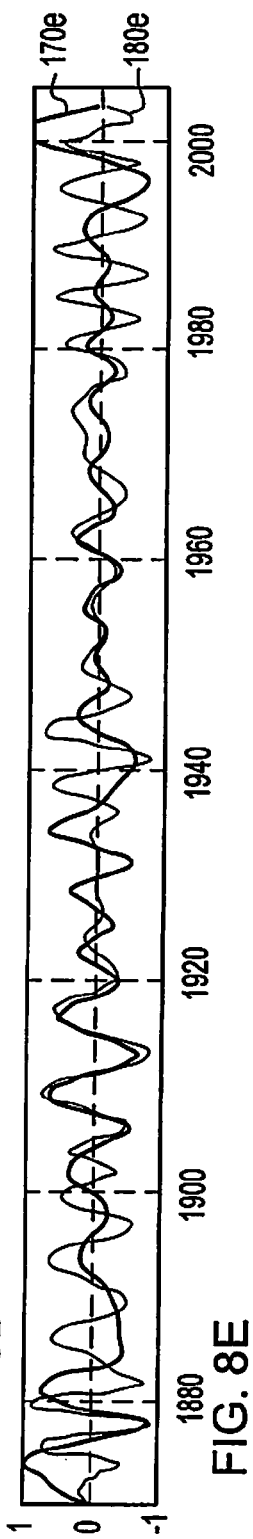

By contrast FIGS. 10A-J show the EIMFs 172a-j, 182a-j are the results of the application of EEMD to the signals 170, 180 of FIGS. 8A-B with $å_n$=0.4 and N=100. Again, to facilitate identifying synchronization, the ordinate axis is inverted for the CTI 170 and its components 172a-j. Remarkably, the synchronizations are much clearer and easier to identify between corresponding EIMFs pairs 172a-j, 182a-j, especially for the $4^{th}$-$7^{th}$ EIMF components 172d-g, 182d-g. Moreover, as would be expected because before 1935 both SOI and CTI are not as reliable, the sparse or missing observations show a lower degree of synchronization in the SOI and of CTI EIMF components 172a-j, 182a-j during that earlier time.

Figure 11:
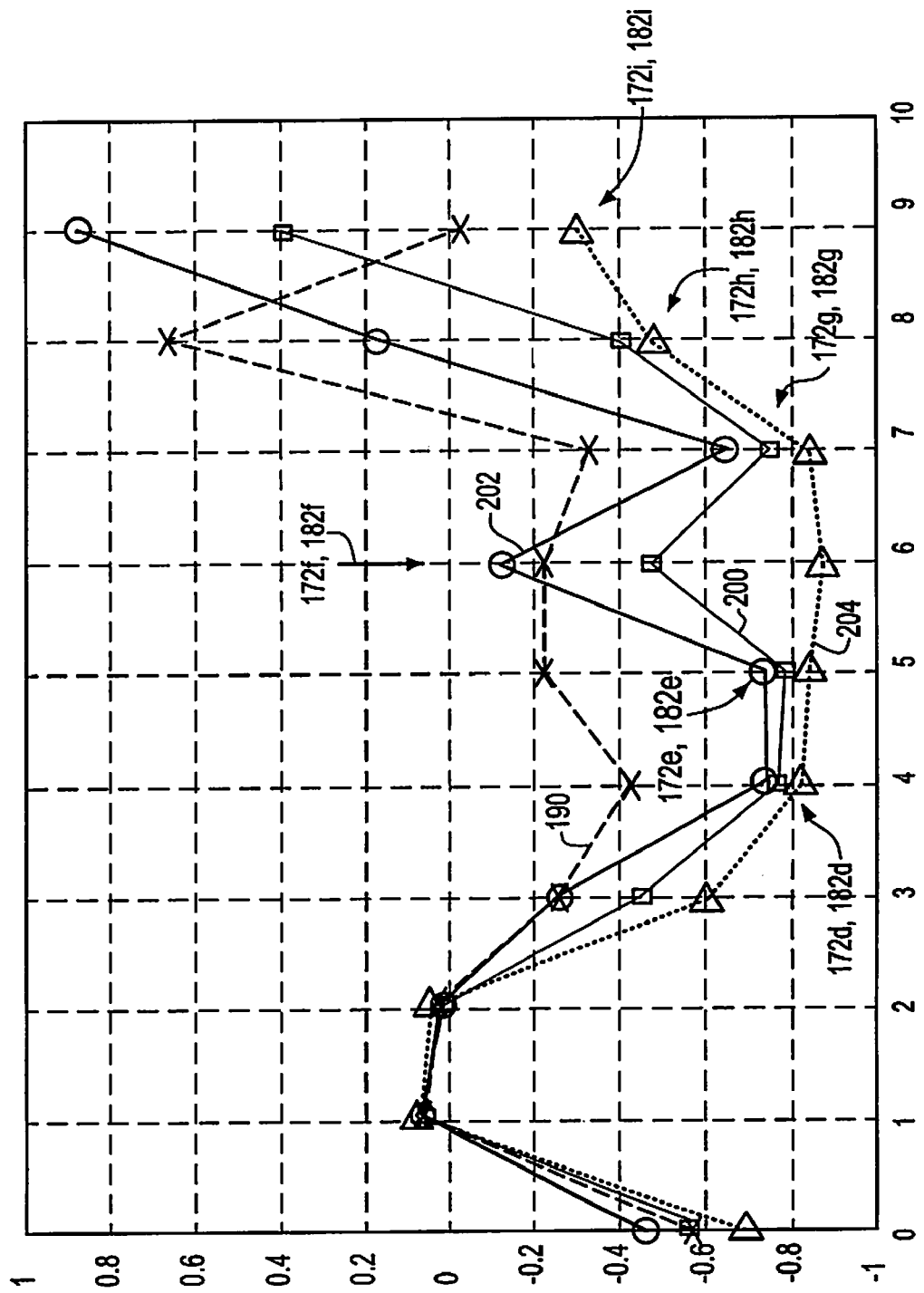
FIG. 11 shows a comparison of correlation coefficients of the SOI and CTI and corresponding EIMFs, over the first period, the final period and the entire period.
Figure 13F:
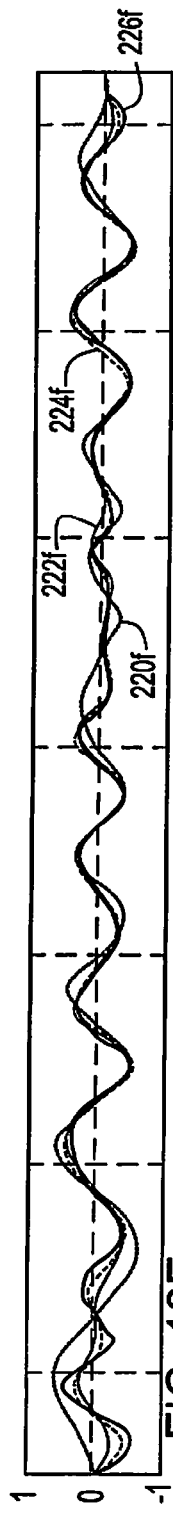
Figure 13G:
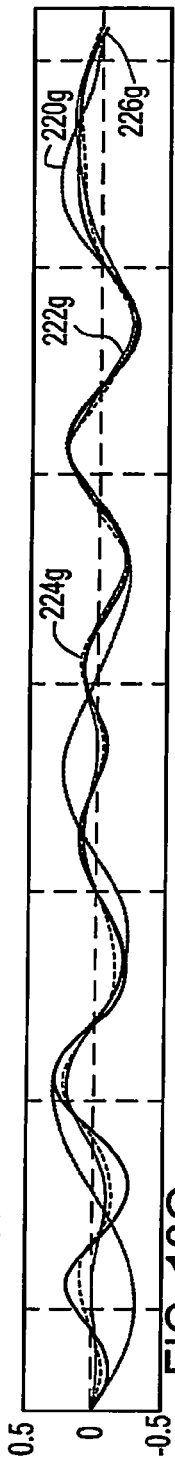
Figure 13H:
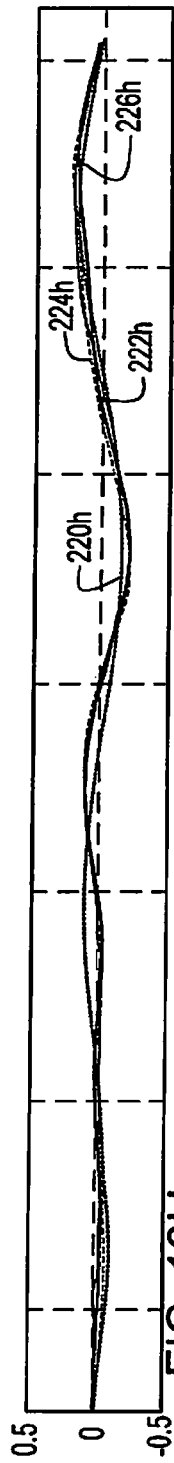
Figure 13I:
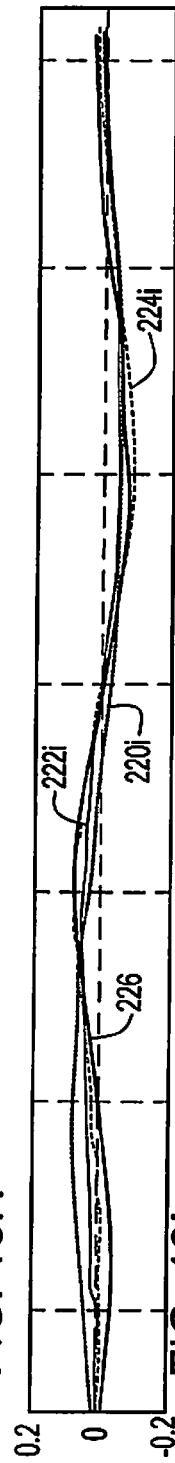
Figure 13J:
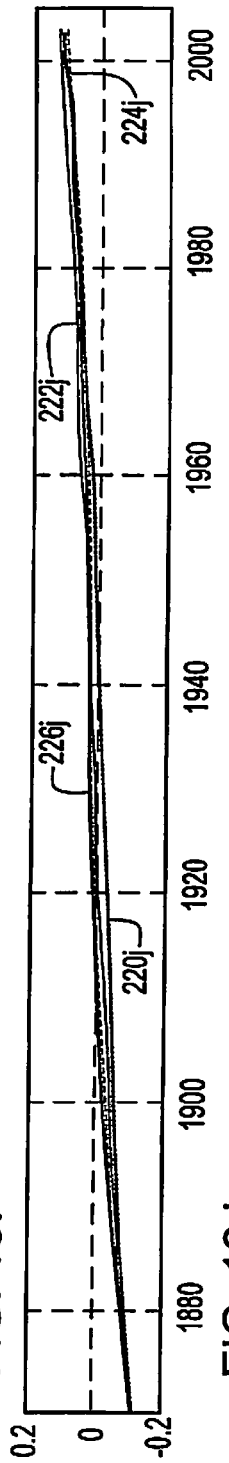

FIG. 11 shows a comparison of the resulting correlation coefficients (ordinate axis) from application of EEMD to the SOI 170 and CTI 180 for EIMFs 172a-j, 182a-j, over the entire period 200, the early period 202 of FIG. 7A, the more recent period 204 of FIG. 7B, and application of EMD to the entire period 190. Clearly, the EIMFs 200, 202, 204 exhibit significantly improved correlation values over IMFs 190. Thus, the EEMD result may facilitate signal identification and isolation over the various scales and reflects the coupling between atmosphere and ocean in the ENSO system. These EEMD results are consistently high correlation, especially for EIMFs 172d, 182d and 172e, 182e with interannual timescales and mean periods of 2.83 and 5.23 years respectively; and, EIMFs 172f, 182f and 172g, 182g with short interdecadal timescales and mean periods of 10.50 and 20.0 years, respectively. The increase of the correlation coefficients from just under 0.68 for the portion of the data to significantly over 0.8 for these IMF pairs is remarkable. Further, where data quality is good, even better correlation coefficient is achieved, i.e., in the second portion/balance of the data 204. This correlation of coefficients is greatly improved over previously achieved results from the same data for these two time series. A lack of oscillation variations in EIMFs arises with the longer interdecadal time scales, e.g., 172h, 182h and 172i, 182i, because of the very small number of degrees of freedom of these EIMF components 172h, 182h and 172i, 182i. Thus, these later EIMF components are typically ignored because the correlation of coefficients tends to be very misleading. Accordingly, this analysis of the ENSO system clearly indicates that the point of most important atmosphere-ocean coupling occurs at a broad time range covering interannual and interdecadal scales from 2 to 20 years.

The high correlations on interannual and short interdecadal timescales between SOI and CTI EIMFs 172c-f, 182c-f, especially in the more recent data, is consistent with the physical explanations from recent studies. So, these EIMFs 172a-j, 182a-j, and especially 172c-f and 182c-f, provide a statistically significant confidence level (95%) with contemporary testing methods using white noise. The two inter-annual EIMFs 172e, 182e and 172f, 182f also provide a statistically significant confidence level (also 95%) against traditional red-noise, null approaches. So, advantageously, EEMD provides a more accurate tool for isolating signals, such as mixed mode signals with specific time scales, in observational data, signals that may originate from disparate physical sources and are, therefore, produced by different underlying physics.

FIGS. 12A-J and FIGS. 13A-J show a comparison of different levels of added noise on resulting SOI and CTI EIMF components, respectively. In this example, the results are extracted from the SOI and CTI signals of FIGS. 7A and B with N=100. Since the overall timescale is much longer than the EIMF period for the first couple of EIMF components, correlation data bleeds together in FIGS. 12A and B or 13A and B. However, individual SOI and CTI EIMF components are shown for EEMD comparing SOI IMF 210a-f and CTI IMF 220a-f ($å_n$=0); SOI EIMF 212a-f and CTI EIMF 222a-f at $å_n$=0.1; SOI EIMF 214a-f and CTI EIMF 224a-f at $å_n$=0.2; and, SOI EIMF 216a-f and CTI EIMF 226a-f at $å_n$=0.4. Clearly, for this example, other than for the simple application EMD ($å_n$=0), synchronization between cases with different levels of added noise is remarkably good.

However, for the simple EMD solution, mode mixing produces an unstable decomposition, where any perturbation may push the result to a different state. Additionally, the improvement in results for the CTI is much more dramatic than that for the SOI, because SOI is much noisier than CTI. Also, the SOI is a more localized measurement, because it is based on noisy observations of sea level data from only two locations (Darwin and Tahiti pressures). By contrast the CTI is based on the averaged observed sea surface temperature at hundreds of locations along the equator. So, EEMD is more effective and provides dramatically improved results with application to an original signal with little or no noise.

Further, it may be shown through additional SOI and CTI decompositions using various noise levels that, provided $å_n$ remains constant, resulting ensemble members are consistent with very little variation. Since EEMD leverages statistical characteristics of noise to extract real data from mixed mode signals with a comparable scale, the EIMFs reveal a natural location within which the signals reside. Moreover, increasing N reduces the contribution of added noise in the decomposed results, i.e., the noise contribution from each set of IMFs from each iteration. Further, although shown here for application to SOI and CTI, EEMD has application to almost any such mixed mode data, and, provides a sort of "uniqueness" and robustness in result that is not found with EMD, and with improved confidence in the decomposition results.

Thus, it may be seen from this example that because the added noise helps to perturb the mixed mode signals, each decomposition examines another possible solution in the finite (not infinitesimal) neighborhood of the true final answer. Also, because the white noise has a zero mean, in summing the corresponding individual IMFs, the added noise self-cancels itself from the background of each EIMF. As a result, the frame of scales for the EIMFs have a uniform distribution, which was previously possible to achieve only through time domain data analysis. Thus, embodiments of the present invention demonstrate a truly noise-assisted data analysis (NADA) method that is effective in extracting meaningful data from complex, and even intermittent, signals.

Figure 14:
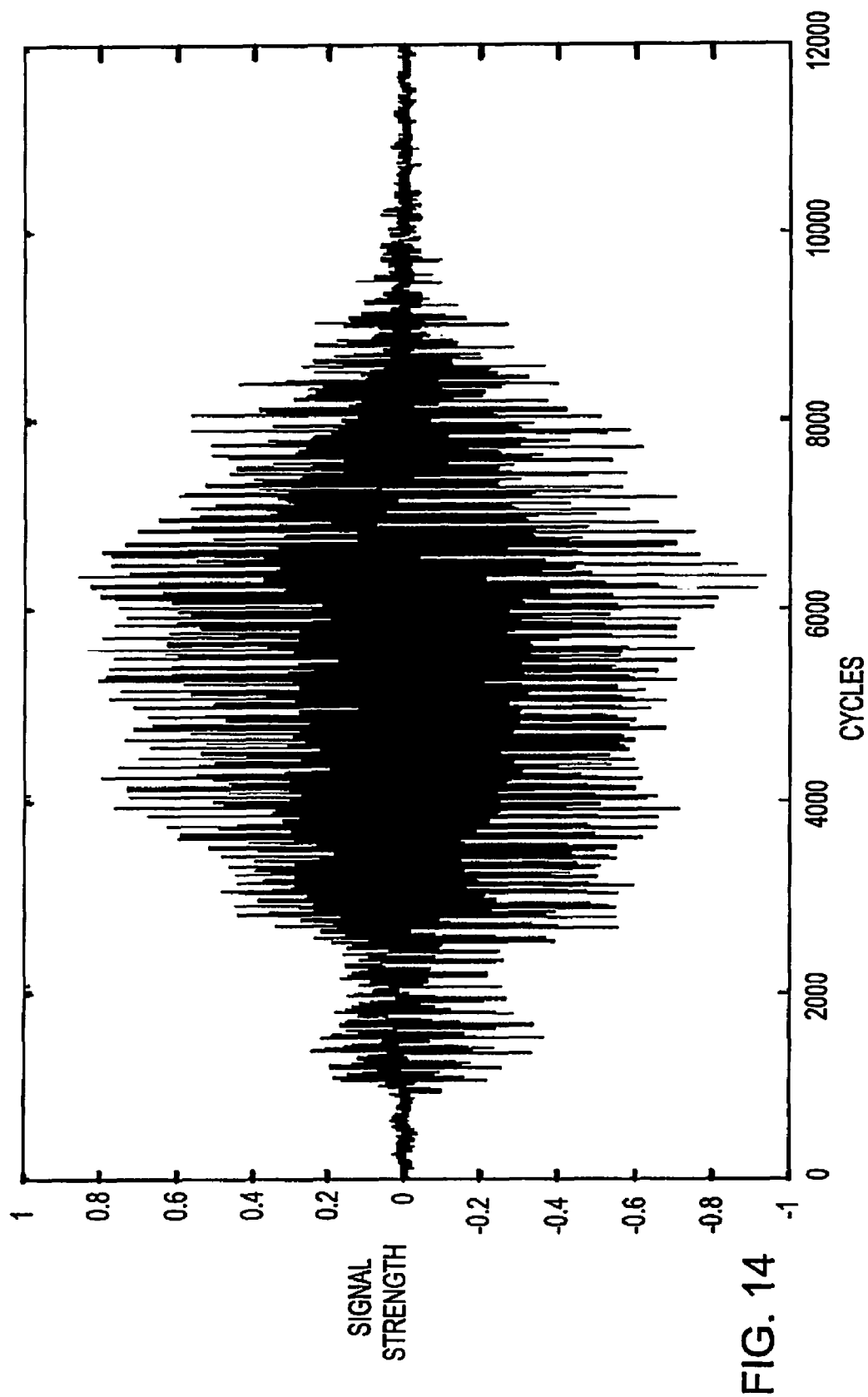
FIG. 14 shows speech data, i.e., a 22,050 Hz digitization of "hello;"
Figure 15:
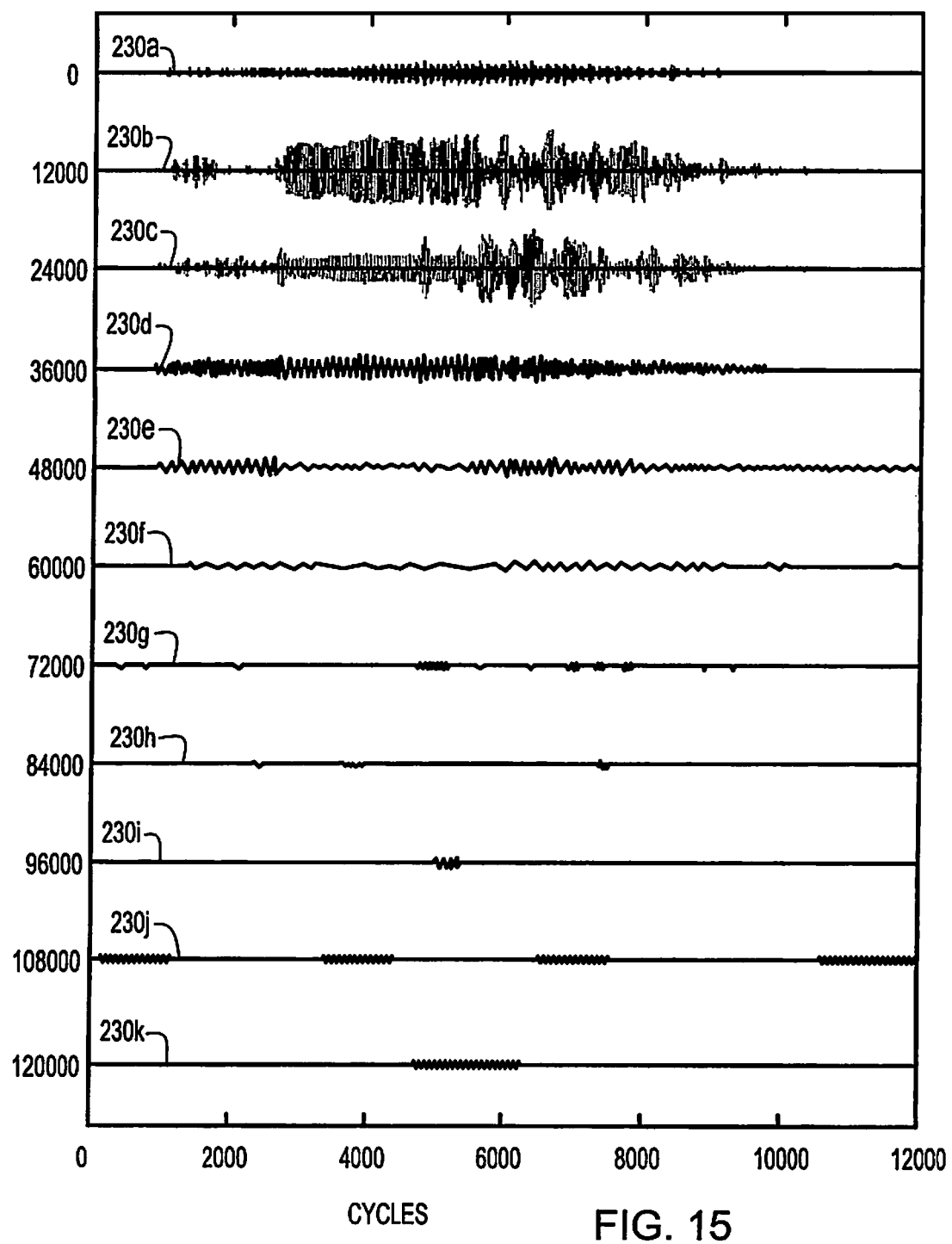
FIG. 15 shows IMF components extracted using EMD.
Figure 16:
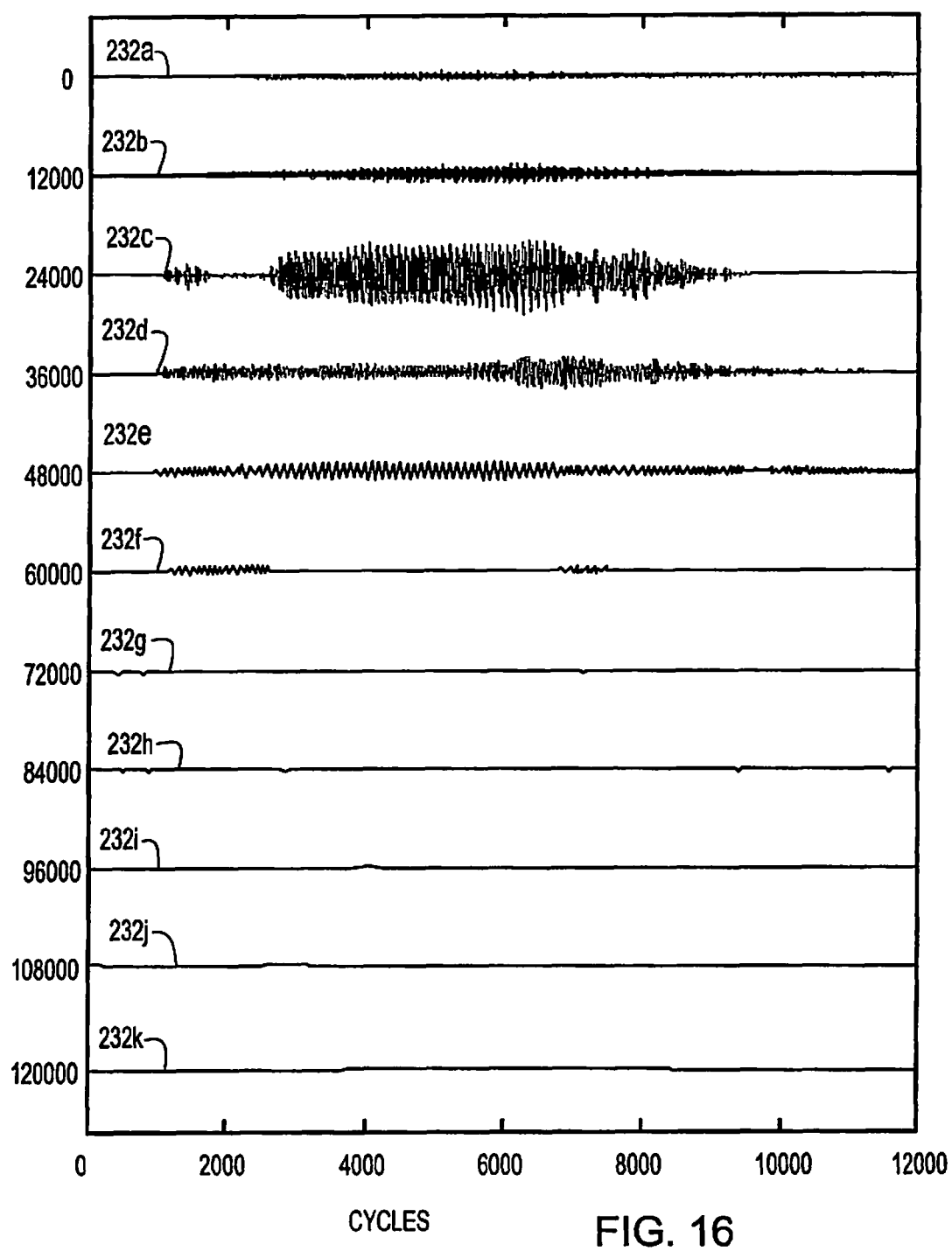
FIG. 16 shows EIMF components extracted using EEMD.

In a second example, FIGS. 14-16 show EEMD as applied to speech data. FIG. 14 shows a 22,050 Hertz (22,050 Hz) digitization of "hello" 230. In FIG. 15, IMF components 230a-k may be extracted using EMD without adding noise. The effects of mode mixing are very clear in the IMF components from the second component 230b and down to the residue 230k, where high disparate amplitudes and time scales in each make mode mixing apparent. Thus, although mode mixing affects some components more than in others, it influences the scale parity in all the IMF components 230a-k.

By contrast, the EIMF components 232a-k of FIG. 16 have more consistent amplitudes and scales. In this example, the noise is selected at an amplitude of 0.2 times that of the data RMS, and N=1000. Thus, the EIMF components 232a-k show dramatic improvement over the IMF components 230a-k of FIG. 15. All EIMF components 232a-k may be continuous and do not exhibit any obvious scale fragmentation. Also, the third EIMF component 232c is almost a full signal that can produce a clear sound and with almost the original audio quality. All other EIMF components 232a, 232b, and 232d-k are also regular and, although the sound produced by each is mostly unintelligible high frequency hissing or low frequency moaning, each respective EIMF component 232a-k has comparable uniform scales and amplitudes. So, once again, EEMD may be capable extracting the essence data that may manifest in the underlying physics of the original signal. Thus, having decomposed speech into true components, those components may be used to produce natural sounding artificial voices, e.g., a computer generated verbal interface.

Figure 17A:
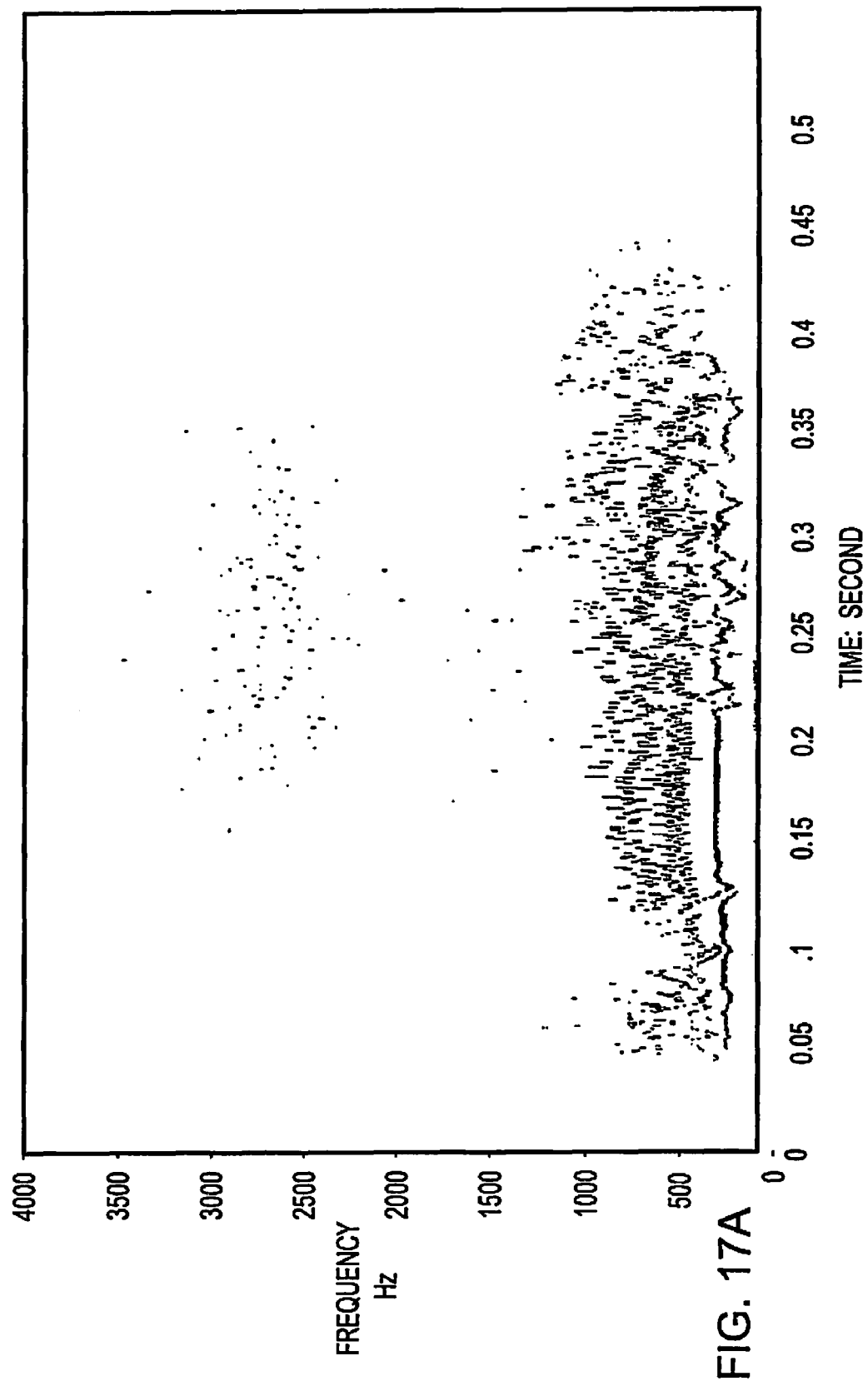
FIGS. 17A-B show the Hilbert spectrum for the IMFs and EIMFs extracted from the vocal signal.
Figure 17B:
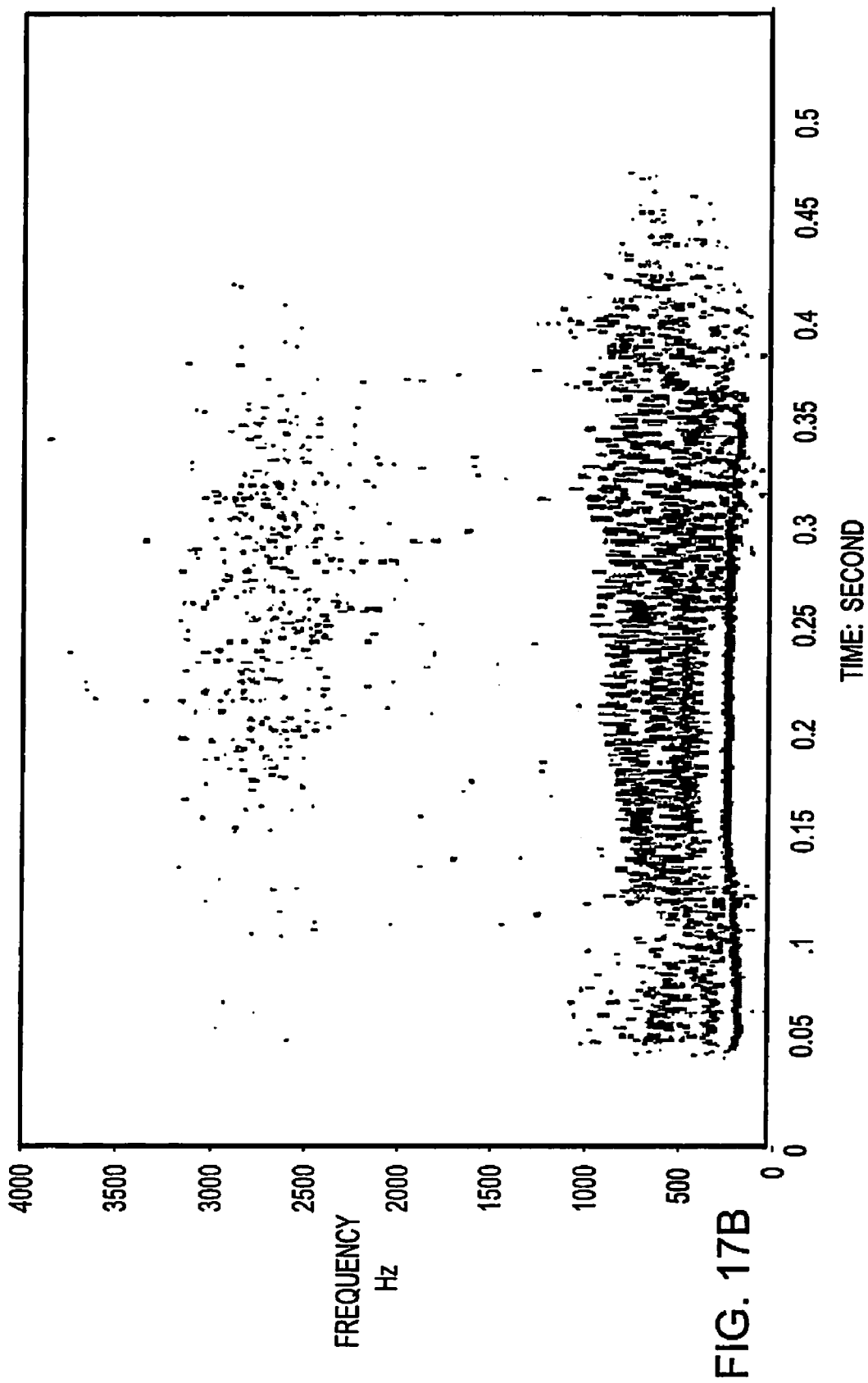

FIGS. 17A-B show the Hilbert spectrum from the vocal signal of FIG. 14 for the IMFs 230a-k of FIG. 15 and EIMFs 232a-k of FIG. 16, respectively. It may be seen from FIG. 17A that mode mixing has caused numerous transition gaps, and rendered the time-frequency traces fragmented. Clearly, the IMFs 230a-k from the original EMD show a fragmented time-frequency distribution from mode mixing. The alias at the transition points from one scale to another is clearly visible. A Hilbert spectrum of this quality could be used only for some general purpose such as identifying the basic frequencies and their ranges of variation. Quantitative measures would be extremely difficult. By contrast, FIG. 17B shows marked improvement in the quality of the time-frequency distribution in Hilbert spectra. Accordingly, the Hilbert spectrum shows enormous improvement and may be continuous for all EIMFs 232a-k with no transitional gaps.

Embodiments of the present invention have major advantages over prior approaches. EEMD simply, yet powerfully separates different scale signals without undue mode mixing that is otherwise inherent in the transitional gaps. Adding white noise from multiple sources or from multiple instances, provides a dyadic reference frame in the time-frequency or time-scale space. Thus, embodiments of the present invention extracts truer signal components with each such ensemble mean, that may be naturally separated without any a priori subjective selection criterion that might artificially color or distort the results. Embodiments of the present invention utilize the statistical characteristics of white noise to perturb the data in its true solution neighborhood, and then cancel itself out (via ensemble averaging) after serving its purpose of extracting true signal components for a truly, NADA method.

While the invention has been described in terms of specific embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A method of analyzing complex signals, said method comprising the steps of:
   collecting a data representation of a complex signal;
   adding, by a computer processor, a plurality of individual instances of noise respectively to the complex signal to generate a plurality of independent versions of said complex signal;
   extracting intrinsic mode functions (IMFs) for each of said independent versions, with said IMFs being indicative of intrinsic oscillatory modes in a corresponding said independent version; and
   combining corresponding IMFs extracted from each of said independent versions wherein said combined IMFs form ensemble IMFs (EIMFs).

2. A method of analyzing complex signals as in claim 1, wherein a selected number (N) of independent versions are formed from N individual instances of white noise.

3. A method of analyzing complex signals as in claim 2, wherein for said complex signal, each signal version has the form $x_i(t)=x(t)+w_i(t)$.

4. A method of analyzing complex signals as in claim 3, wherein each said signal version decomposes into components $c_{ij}(t)$ and residue $r_{in}(t)$, said each signal version having the form $$x_i(t) = \sum_{j=1}^{n}(c_{ij}(t) + r_{in}).$$

5. A method of analyzing complex signals as in claim 4, wherein each IMF $c_{ij}(t)$ has the form $c_{i(j-1)}(t)=c_{ij}(t)+r_{i(j-1)}(t)$.

6. A method of analyzing complex signals as in claim 1, wherein individual instances of white noise are generated using N different random number seeds.

7. A method of analyzing complex signals as in claim 1, wherein combining said corresponding IMFs comprises computing the mean of said corresponding IMFs.

8. A non-transitory computer readable medium containing instructions stored therein for causing a computer processor to perform:
   collecting a data representation of a complex signal;
   adding a plurality of individual instances of noise to said complex signal to produce independent versions of said complex signal;
   extracting intrinsic mode functions (IMFs) from each of said independent versions of complex signal, each said extracted IMF being indicative of intrinsic oscillatory modes in a corresponding independent version; and
   combining said corresponding IMFs extracted from each of said independent versions, combined said IMFs forming ensemble IMFs (EIMFs).

9. A non-transitory computer readable medium as in claim 8, wherein the plurality of individual instances of noise comprise white noise.

10. A non-transitory computer readable medium as in claim 8, wherein the computer readable program code functions embedded in said medium are further configured to cause a computer to
generate a selected number (N) of individual instances of white noise $w_i(t)$ of magnitude $\alpha$; and
add said complex signal to each of said instances, one of said plurality of independent versions being formed from said combination N.

11. A non-transitory computer readable medium as in claim 10, wherein the instructions stored therein for causing a computer processor is configured to cause a computer to add each instance white noise to said complex signal.

12. A non-transitory computer readable medium as in claim 11, wherein the instructions stored therein for causing a computer processor is configured to cause a computer to decompose each signal version (i) into components IMF $c_{ij}(t)$ and residue $r_{in}(t)$, said each signal version having the form $$x_i(t) = \sum_{j=1}^{n} (c_{ij}(t) + r_{in}).$$

13. A non-transitory computer readable medium as in claim 12, wherein each IMF $c_{ij}(t)$ extracted has the form $$c_{i(j-1)}(t) = c_{ij}(t) + r_{i(j-1)}(t).$$

14. A non-transitory computer readable medium as in claim 8, wherein the plurality of individual instances of noise are generated using random number seeds.

15. A non-transitory computer readable medium as in claim 8, wherein the computer readable program code functions embedded in said medium are further configured to cause a computer to compute the mean of said corresponding IMFs.

16. A non-transitory computer readable medium as in claim 8, wherein the IMFs are extracted by Empirical Mode Decomposition (EMD).

17. A system for analyzing complex signals comprising:
storage configured to store signal data;
a signal version generator configured to add noise to said signal data to generate individual versions of said stored signal data;
a signal sifter configured to extract intrinsic mode functions (IMFs) indicative of intrinsic oscillatory modes from each of said individual versions; and
an IMF combiner configured to combine corresponding IMFs extracted from each generated signal version, an ensemble IMF (EIMF) being generated by said combining.

18. A system as in claim 17, wherein the signal version generator comprises a noise generator that is configured to generate the noise.

19. A system as in claim 18, wherein said noise generator comprises a white noise generator configured to generate white noise from random number seeds.

20. A system as in claim 17, wherein a signal version generator comprises:
a white noise $w_i(t)$ generator configured to generate a selected number (N) of individual instances of white noise with a magnitude $\alpha$; and
an adder for adding said signal data with each of said N individual instances.

21. A system as in claim 17, wherein said signal version generator comprises:
a selected number (N) of white noise $w_i(t)$ generators, each generating one of N individual instances of white noise, each of said N individual instances having a magnitude $\alpha$; and
N adders, each adding said signal data to one of said N individual instances.

22. A system as in claim 17, wherein said signal sifter is configured to decompose each signal version (i) into IMF components $c_{ij}(t)$ and residue $r_{in}(t)$, said each signal version having the form $$x_i(t) = \sum_{j=1}^{n} (c_{ij}(t) + r_{in}).$$

23. A system as in claim 22, wherein each IMF component $c_{ij}(t)$ extracted by said signal sifter has the form $$c_{i(j-1)}(t) = c_{ij}(t) + r_{i(j-1)}(t).$$

24. A system as in claim 23, wherein said signal sifter is configured to perform Empirical Mode Decomposition (EMD).

25. A system as in claim 17, wherein said IMF combiner is configured to compute the mean of said corresponding IMFs.

* * * * *